United States Patent
Asanuma et al.

(12) 
(10) Patent No.: US 6,668,548 B1
(45) Date of Patent: Dec. 30, 2003

(54) EXHAUST EMISSION CONTROL DEVICE OF INTERNAL COMBUSTION ENGINE

(75) Inventors: Takamitsu Asanuma, Susono (JP); Shinya Hirota, Susono (JP); Shunsuke Toshioka, Susono (JP); Toshiaki Tanaka, Numazu (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/959,672

(22) PCT Filed: Apr. 5, 2000

(86) PCT No.: PCT/JP00/02204

§ 371 (c)(1),
(2), (4) Date: Nov. 2, 2001

(87) PCT Pub. No.: WO00/68554

PCT Pub. Date: Nov. 16, 2000

(30) Foreign Application Priority Data

| May 7, 1999 | (JP) | 11-127550 |
| Jun. 4, 1999 | (JP) | 11-158186 |
| Jun. 16, 1999 | (JP) | 11-169933 |
| Sep. 6, 1999 | (JP) | 11-251790 |
| Sep. 17, 1999 | (JP) | 11-263968 |
| Oct. 29, 1999 | (JP) | 11-309848 |

(51) Int. Cl.⁷ .................. F01N 3/00
(52) U.S. Cl. .......... 60/286; 60/284; 60/292; 60/324
(58) Field of Search .......... 60/285, 286, 297, 60/299, 292, 324, 291, 284

(56) References Cited

U.S. PATENT DOCUMENTS

| 5,046,308 A | * | 9/1991 | Longobardi et al. | 60/311 |
| 5,224,335 A | | 7/1993 | Yoshizaki | 60/300 |
| 5,839,275 A | | 11/1998 | Hirota et al. | 60/285 |
| 5,934,072 A | * | 8/1999 | Hirota et al. | 60/301 |
| 6,014,859 A | * | 1/2000 | Yoshizaki et al. | 60/285 |
| 6,032,753 A | * | 3/2000 | Yamazaki et al. | 180/65.3 |
| 6,055,807 A | * | 5/2000 | Schatz et al. | 60/274 |
| 6,178,743 B1 | * | 1/2001 | Hirota et al. | 60/277 |

FOREIGN PATENT DOCUMENTS

| EP | 0 943 793 | | 9/1999 |
| EP | 0 953 756 | | 11/1999 |
| JP | 49-80414 | | 8/1974 |
| JP | 58-087113 | | 5/1982 |
| JP | 58-065923 | * | 4/1983 |
| JP | 58-156132 | | 10/1983 |
| JP | 03-271515 | * | 12/1991 |
| JP | 4-111540 | | 9/1992 |
| JP | 05-044436 | * | 2/1993 |
| JP | 06-108884 | * | 4/1994 |
| JP | 7-063104 | | 3/1995 |
| JP | 8-100638 | | 4/1996 |
| JP | 8-158897 | | 6/1996 |
| JP | 8-296485 | | 11/1996 |
| JP | 8-303290 | | 11/1996 |
| JP | 10-212995 | | 8/1998 |
| JP | 10-238336 | * | 9/1998 |
| JP | 11-082181 | | 3/1999 |
| JP | 2000-054827 | | 2/2000 |
| JP | 2000-110642 | | 4/2000 |
| JP | 2000-161116 | | 6/2000 |

\* cited by examiner

Primary Examiner—Binh Tran
Assistant Examiner—Diem Tran
(74) Attorney, Agent, or Firm—Kenyon & Kenyon

(57) ABSTRACT

An exhaust control valve (24) is arranged in an exhaust pipe (22) of an internal combustion engine. At the time of engine startup and warmup operation, the exhaust control valve (24) is substantially fully closed, the amount of injection of main fuel is increased from the optimum amount of injection at the time when the exhaust control valve is fully opened, auxiliary fuel is additionally injected during the expansion stroke, and thereby the unburned hydrocarbons exhausted into the atmosphere is greatly reduced at the time of engine startup and warmup operation.

33 Claims, 28 Drawing Sheets

EXHAUST EMISSION CONTROL DEVICE OF INTERNAL COMBUSTION ENGINE

TECHNICAL FIELD

The present invention relates to an exhaust gas purification device of an internal combustion engine.

BACKGROUND ART

In a diesel engine, at the time of low speed, low load operation of the engine, in particular at the time of warmup operation of the engine, the temperature inside the combustion chamber becomes lower and as a result a large amount of unburned hydrocarbons is generated. Therefore, known in the art has been a diesel engine having an exhaust control valve arranged in an engine exhaust passage, closing the exhaust control valve and greatly increasing the amount of fuel injection at the time of engine low speed, low load operation so as to raise the temperature in the combustion chamber and cause the injected fuel to completely burn in the combustion chamber and thereby keep down the amount of generation of unburned hydrocarbons (see Japanese Unexamined Patent Publication (Kokai) No. 49-801414).

Further, when arranging an exhaust purification catalyst in an engine exhaust passage, if the temperature of the catalyst does not become sufficiently high, a good exhaust purification action is not obtained by the catalyst. Therefore, known in the art is an internal combustion engine which injects auxiliary fuel during the expansion stroke in addition to the injection of the main fuel for generating the engine output and causes the auxiliary fuel to burn so as to cause the temperature of the exhaust gas to rise and thereby cause the temperature. of the catalyst to rise (see Japanese Unexamined Patent Publication (Kokai) No. 8-303290 and Japanese Unexamined Patent Publication (Kokai) No. 10-212995).

Further, known in the art is a catalyst able to absorb unburned hydrocarbons. This catalyst has the property that the higher the surrounding pressure, the greater the amount of absorption of unburned hydrocarbons and that when the pressure of the surroundings becomes lower, the absorbed unburned hydrocarbons are released. Therefore, known in the art is an internal combustion engine which utilizes this property to reduce the $NO_x$ by the unburned hydrocarbons released from the catalyst by arranging this catalyst in an engine exhaust passage, arranging an exhaust control valve inside the engine exhaust passage downstream of the catalyst, injecting a small amount of auxiliary fuel during an expansion stroke or exhaust stroke in addition to main fuel for generating engine output at the time of engine low speed, low load operation when the amount of generation of $NO_x$ is small, exhausting a large amount of unburned hydrocarbons from the combustion chamber, closing the exhaust control valve to a relatively small opening degree at this time so that the drop in engine output falls within the allowable range so as to raise the pressure inside the exhaust passage and cause a large amount of unburned hydrocarbons exhausted from the combustion chamber to be absorbed in the catalyst, fully opening the exhaust control valve to cause the pressure in the exhaust passage to fall at the time of engine high speed or high load operation when the amount of generation of $NO_x$ is large, and reducing the $NO_x$ by the unburned hydrocarbons released from the catalyst at this time (see Japanese Unexamined Patent Publication (Kokai) No. 10-238336).

Further, current diesel engines of course and also spark ignition type internal combustion engines have the major problem of how to reduce the amount of unburned hydrocarbons generated at the time of engine low load operation, in particular at the time of warmup operation of the engine. Therefore, the present inventors engaged in experiments and research to solve this problem and as a result found that to greatly reduce the amount of unburned hydrocarbons exhausted into the atmosphere at the time of warmup operation of an engine etc., it is necessary to reduce the amount of unburned hydrocarbons generated in the combustion chamber and simultaneously to increase the amount of reduction of unburned hydrocarbons in the exhaust passage.

Specifically speaking, they learned that if auxiliary fuel is additionally injected into the combustion chamber during the expansion stroke or exhaust stroke and that auxiliary fuel burned and if an exhaust control valve is provided in the engine exhaust passage a considerable distance away from the output of the engine exhaust port and the exhaust control valve is made to substantially completely close, the synergistic effect of the combustion of the auxiliary fuel and the exhaust throttling action due to the exhaust control valve causes the amount of generation of the unburned hydrocarbons in the combustion chamber to fall and the amount of unburned hydrocarbons in the exhaust passage to rise and thereby enables the amount of unburned hydrocarbons exhausted into the atmosphere to be greatly reduced.

Explaining this a bit more specifically, when auxiliary fuel is injected, not only is the auxiliary fuel itself burned, but also the unburned hydrocarbons left over after burning the main fuel is burned in the combustion chamber. Therefore, not only is the amount of unburned hydrocarbons generated in the combustion chamber greatly reduced, but also the unburned hydrocarbons remaining after burning the main fuel and the auxiliary fuel are burned, so the temperature of the burned gas becomes considerably high.

On the other hand, if the exhaust control valve is substantially completely closed, the pressure in the exhaust passage from the exhaust port of the engine to the exhaust control valve, that is, the back pressure, becomes considerably high. A high back pressure means that the temperature of the exhaust gas exhausted from the combustion chamber does not fall that much. Therefore, the temperature of the exhaust gas in the export port becomes considerably high. On the other hand, a high back pressure means that the flow rate of the exhaust gas exhausted in the export port is slow. Therefore, the exhaust gas remains in a high temperature state in the exhaust passage upstream of the exhaust control valve over a long period of time. During that time, the unburned hydrocarbons contained in the exhaust. gas are oxidized and therefore the amount of unburned hydrocarbons exhausted into the atmosphere is greatly reduced.

In this case, if auxiliary fuel were not injected, the unburned hydrocarbons left over after burning the main fuel remain as they are, so a large amount of unburned hydrocarbons is generated in the combustion chamber. Further, if auxiliary fuel were not injected, the temperature of the burned gas in the combustion chamber would not become that high, so even if substantially fully closing the exhaust control valve at this time, a sufficient action in purifying the unburned hydrocarbons in the exhaust passage upstream of the exhaust control valve could not be expected. Therefore, at this time, a large amount of unburned hydrocarbons would be exhausted into the atmosphere.

On the other hand, even if not throttling the exhaust by the exhaust control valve, if injecting auxiliary fuel, the amount of unburned hydrocarbons generated in the combustion chamber is reduced and the temperature of the burned gas in the combustion chamber becomes high. When not throttling the exhaust by the exhaust control valve, however, the pressure of the exhaust gas immediately falls after the exhaust gas is exhausted from the combustion chamber and therefore the temperature of the exhaust gas immediately falls. Therefore, in this case, almost no action of oxidation of the unburned hydrocarbons in the exhaust passage can be expected and therefore a large amount of unburned hydrocarbons is exhausted into the atmosphere at this time as well.

That is, to greatly reduce the amount of unburned hydrocarbons exhausted into the atmosphere, it becomes necessary to inject auxiliary fuel and simultaneously substantially fully close the exhaust control valve.

In the diesel engine described in the above Japanese Unexamined Patent Publication (Kokai) No. 49-80414, no auxiliary fuel is injected and the amount of main fuel injected is greatly increased, so the temperature of the exhaust gas rises, but an extremely large amount of unburned hydrocarbons is generated in the combustion chamber. If an extremely large amount of hydrocarbons is generated in the combustion chamber, even if there is an oxidation action of the unburned hydrocarbons in for example the exhaust passage, only part of the unburned hydrocarbons will be oxidized, so a large amount of unburned hydrocarbons will be exhausted into the atmosphere.

On the other hand, in the internal combustion engine described in the above-mentioned Japanese Unexamined Patent Publication (Kokai) No. 8-303290 or Japanese Unexamined Patent Publication (Kokai) No. 10-212995, since there is no exhaust throttling action by the exhaust control valve, almost no action in oxidizing the unburned hydrocarbons in the exhaust passage can be expected. Therefore, even in this internal combustion engine, a large amount of unburned hydrocarbons is exhausted into the atmosphere.

Further, in the internal combustion engine described in the above-mentioned Japanese Unexamined Patent Publication (Kokai) No. 10-238336, the exhaust control valve is closed to a relatively small opening degree so that the drop in output of the engine falls within an allowable range and therefore in this internal combustion engine, the amount of main fuel injected is maintained at an identical amount of injection when the exhaust control valve is fully opened and when it is closed. With an amount of closure of the exhaust control valve of an extent where the drop in engine output falls within an allowable range, however, the back pressure does not become that high.

Further, in this internal combustion engine, to generate the unburned hydrocarbons to be absorbed in the catalyst, a small amount of auxiliary fuel is injected into the expansion stroke or exhaust stroke. In this case, if the auxiliary fuel can be burned well, no unburned hydrocarbons are generated any longer, so in this internal combustion engine, the injection of the auxiliary fuel is controlled so that the auxiliary fuel is not burned well. Therefore, in this internal combustion engine, it is believed that a small amount of auxiliary fuel does not contribute that much to the rise in temperature of the burned gas.

In this way, in this internal combustion engine, it is believed that a large amount of unburned hydrocarbons is generated in the combustion chamber and further the back pressure does not become that high and the temperature of the unburned gas does not rise that much, so the unburned hydrocarbons are not oxidized that much even in the exhaust passage. In this internal combustion engine, the objective is to cause as large an amount of unburned hydrocarbons to be absorbed in the catalyst. Therefore, thinking in this way can be said to be rational.

DISCLOSURE OF THE INVENTION

An object of the present invention is to provide an exhaust gas purification device of an internal combustion engine able to ensure stable operation of the engine and greatly reduce the amount of unburned hydrocarbons exhausted into the atmosphere.

According to the present invention, there is provided an exhaust gas purification device of an internal combustion engine wherein an exhaust control valve is arranged a predetermined distance away from an outlet of an engine exhaust port inside an exhaust passage connected to the outlet of the exhaust port; when it is judged that the amount of unburned hydrocarbons exhausted into the atmosphere is to be reduced, the exhaust control valve is substantially fully closed and, in addition to burning the main fuel injected into the combustion chamber under excess air to generate engine output, auxiliary fuel is additionally injected into the combustion chamber at a predetermined timing in the expansion stroke or exhaust stroke where the auxiliary fuel can be burned so that the amount of unburned hydrocarbons produced in the combustion chamber is reduced and the oxidizing reaction of hydrocarbons in the exhaust port and the exhaust passage upstream of the exhaust control valve is promoted; and when the exhaust control valve is substantially fully closed, the amount of injection of main fuel is increased compared with the case where the exhaust control valve is fully opened under the same engine operating conditions so as to approach the torque generated by the engine when the exhaust control valve is fully opened under the same engine operating conditions.

BEST MODE FOR WORKING THE INVENTION

Figure 1:
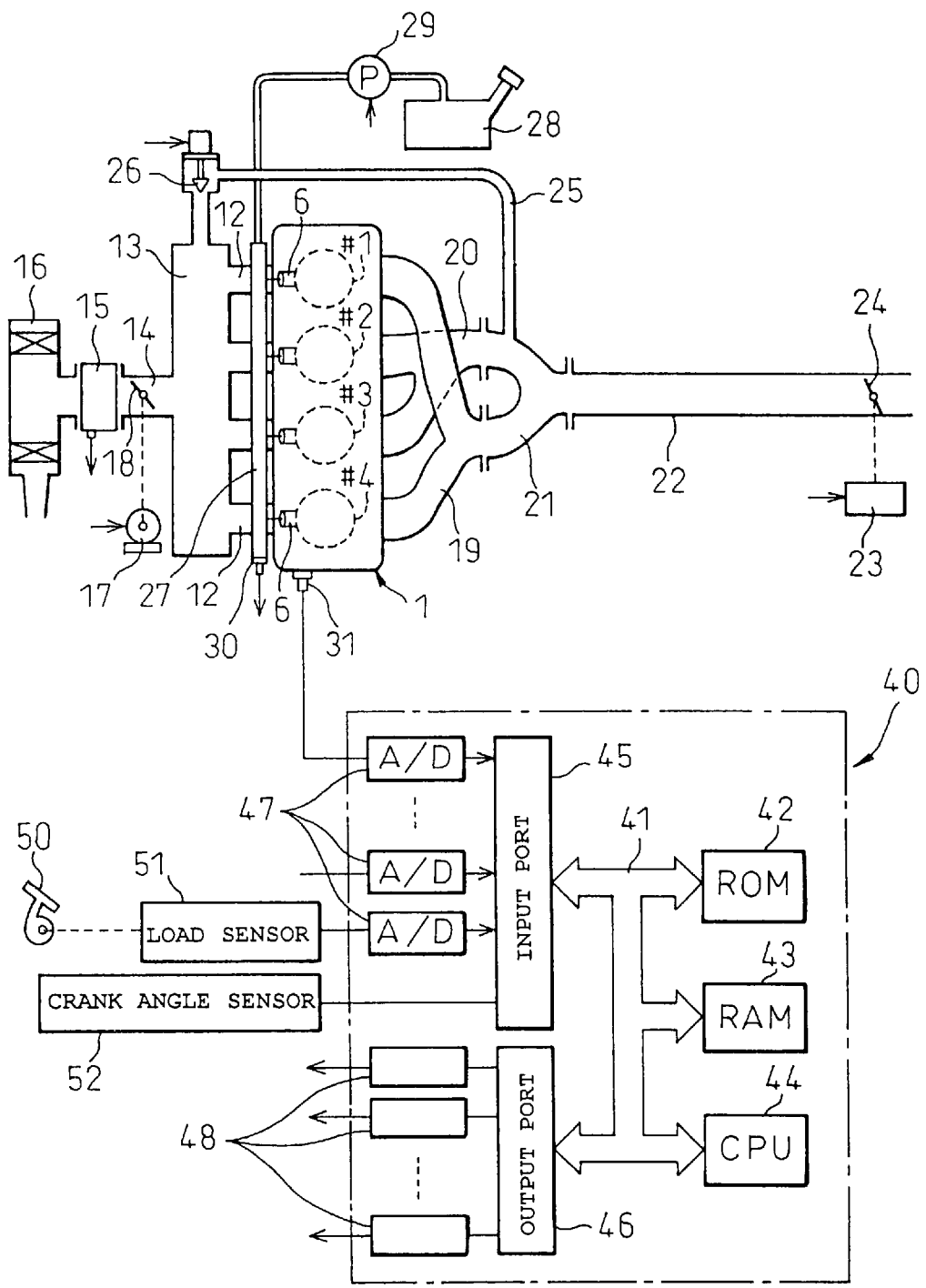
FIG. 1 is an overall view of an internal combustion engine.
Figure 2:
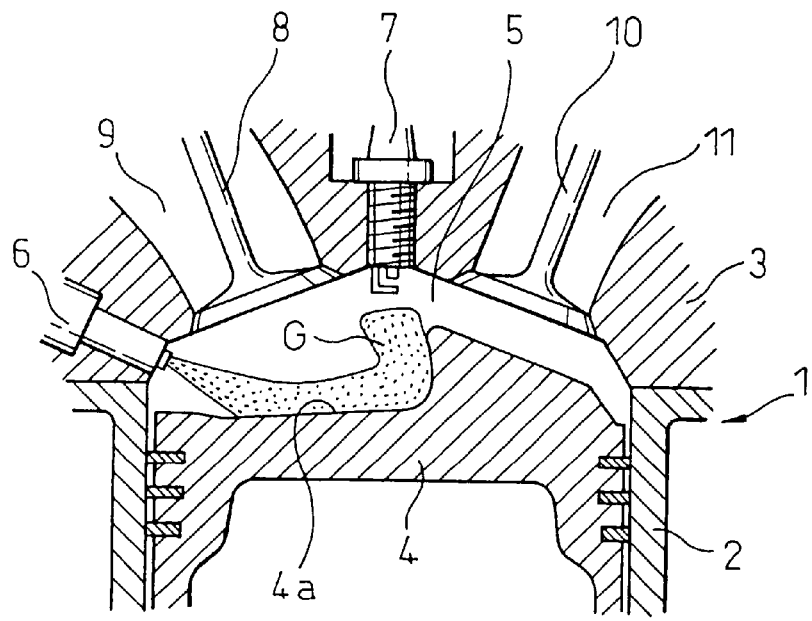
FIG. 2 is a side sectional view of a combustion chamber.

FIG. 1 and FIG. 2 show the case of application of the present invention to a stratified combustion type internal combustion engine. The present invention, however, can also be applied to a spark ignition type internal combustion engine wherein combustion is performed under a uniform lean air-fuel ratio and a diesel engine where combustion is performed under excess air.

Referring to FIG. 1, 1 indicates an engine body. The engine body 1 has four cylinders comprised of a no. 1 cylinder #1, no. 2 cylinder #2, no. 3 cylinder #3, and no. 4 cylinder #4. FIG. 2 is a side sectional view of each of the cylinders #1, #2, #3, and #4. Referring to FIG. 2, 2 is a cylinder block, 3 a cylinder head, 4 a piston, 5 a combustion chamber, 6 a fuel injector arranged at the edge of the inner wall of the cylinder head 3, 7 a spark plug arranged at the center of the inner wall of the cylinder head 3, 8 an intake valve, 9 an intake port, 10 an exhaust valve, and 11 an exhaust port.

Referring to FIG. 1 and FIG. 2, the intake port 9 is connected to a surge tank 13 through a corresponding intake tube 12, while the surge tank 13 is connected to an air cleaner 16 through an intake duct 14 and air flow meter 15. Inside the intake duct 14 is arranged a throttle valve 18 driven by a step motor 17. On the other hand, in the embodiment shown in FIG. 1, the firing order is made 1-3-4-2. As shown in FIG. 1, the exhaust ports 11 of the cylinders #1 and #4 of every other position in the firing order are connected to a common first exhaust manifold 19, while the exhaust ports 11 of the remaining cylinders #2 and #3 of every other position in the firing order are connected to a common second exhaust manifold 20. These first exhaust manifold 19 and second exhaust manifold 20 are connected to a common exhaust pipe 21. The exhaust pipe 21 is connected to a separate exhaust pipe 22. Inside the exhaust pipe 22 is arranged an exhaust control valve 24 driven by an actuator 23 comprised of a vacuum operated diaphragm device or electric motor.

As shown in FIG. 1, the exhaust pipe 21 and surge tank 13 are connected to each other through an exhaust gas recirculation (hereinafter referred to as "EGR") passage 25. Inside the EGR passage 25 is arranged an electrically controlled EGR control valve 26. The fuel injector 6 is connected to a common fuel reservoir, that is, a so-called common rail 27. The fuel inside the fuel tank 28 is supplied into the common rail 27 through an electrically controlled variable discharge fuel pump 29. The fuel supplied in the common rail 27 is supplied to each fuel injector 6. The common rail 27 has a fuel pressure sensor 30 attached to it for detecting the fuel pressure in the common rail 27. The discharge of the fuel pump 29 is controlled based on the output signal of the fuel pressure sensor 30 so that the fuel pressure in the common rail 27 becomes a target fuel pressure.

An electronic control unit 40 is comprised of a digital computer provided with a ROM (read only memory) 42, RAM (random access memory) 43, CPU (microprocessor) 44, input port 45, and output port 46 connected to each other through a bidirectional bus 41. The air flow meter 15 generates an output voltage proportional to the amount of intake air. Its output voltage is input to the input port 45 through the corresponding AD converter 47. The engine body 1 has a water temperature sensor 31 attached to it for detecting the engine coolant water temperature. The output signal of the water temperature sensor 31 is input to the input port 45 through a corresponding AD converter 47. Further, the input port 45 receives as input the output signal of the fuel pressure sensor 30 through the corresponding AD converter 47.

Further, an accelerator pedal 50 has connected to it a load sensor 51 generating an output voltage proportional to the amount of depression L of the accelerator pedal 50. The output voltage of the load sensor 51 is input to the input port 45 through the corresponding AD converter 47. Further, the input port 45 has connected to it a crank angle sensor 52 generating an output pulse each time a crankshaft rotates by for example 30 degrees. On the other hand, the output port 46 is connected through corresponding drive circuits 48 to the fuel injectors 6, the spark plugs 7, the step motor 17 for driving the throttle valve, the actuator 23 for controlling the exhaust control valve, the EGR control valve 26, and the fuel pump 29.

Figure 4:
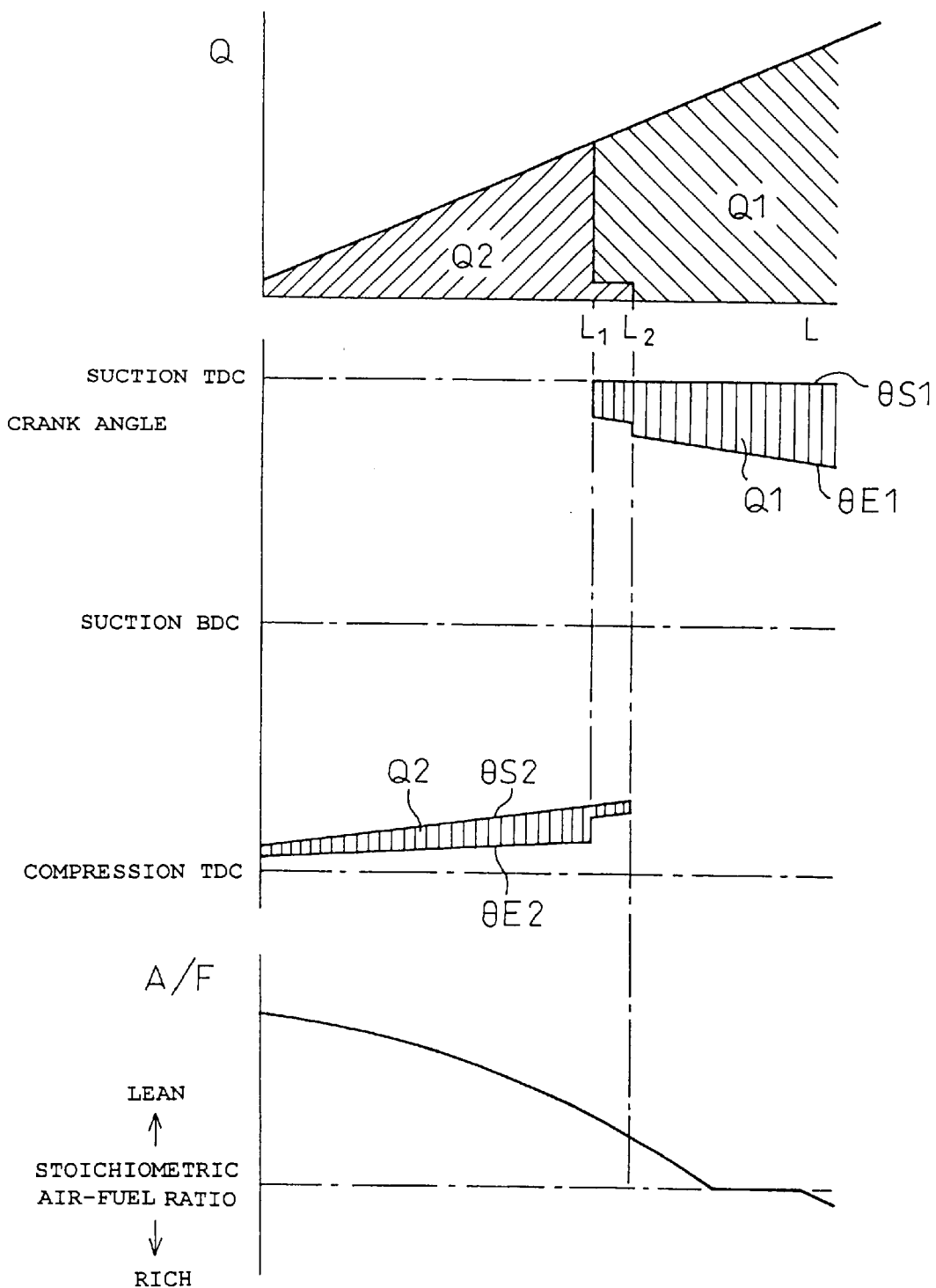
FIG. 4 is a view of the amount of injection, injection timing, and air-fuel ratio.

FIG. 4 shows the amounts of fuel injection Q1, Q2, and Q $(=Q_1+Q_2)$, the injection start timings θS1 and θS2, injection end timings θE1 and θE2, and mean air-fuel ratio A/F in the combustion chamber 5. Note that in FIG. 4, the abscissa L shows the amount of depression of the accelerator pedal 50, that is, the required load.

As will be understood from FIG. 4, when the required load L is lower than $L_1$, the fuel injection Q2 is performed between θS2 and θE2 at the end of the compression stroke.

At this time, the mean air-fuel ratio A/F becomes considerably lean. When the required load L is between $L_1$ and $L_2$, the first fuel injection Q1 is performed between $\theta S1$ and $\theta E1$ of the start of the suction stroke, then the second fuel injection Q2 is performed between $\theta S2$ and $\theta E2$ of the end of the compression stroke. At this time as well, the air-fuel ratio A/F becomes lean. When the required load is larger than $L_2$, the fuel injection Q1 is performed between $\theta S1$ and $\theta E1$ at the start of the suction stroke. At this time, when the required load L is in the low region, the mean air-fuel ratio A/F is made lean, when the required load becomes high, the mean air-fuel ratio A/F is made the stoichiometric air-fuel ratio, while when the required load L becomes further higher, the mean air-fuel ratio A/F is made rich. Note that the operating region where the fuel injection Q2 is performed only at the end of the compression stroke, the operating region where the fuel injections Q1 and Q2 are performed twice, and the operating region where the fuel injection Q1 is performed only at the start of the suction stroke are not determined by. just the required load L and are in actuality determined by the required load L and the engine speed.

FIG. 2 shows the case where the fuel injection Q2 is performed only when the required load L is smaller than $L_1$ (FIG. 4), that is, at the end of the compression stroke. As shown in FIG. 2, a cavity 4a is formed in the top surface of the piston 4. When the required load L is lower than $L_1$, fuel is injected from the fuel injector 6 toward the bottom wall of the cavity 4a. This fuel is guided by the peripheral wall of the cavity 4a and heads toward the spark plug 7. Due to this, an air-fuel mixture G is formed around the spark plug 7. Next, this air-fuel mixture G is made to ignite by the spark plug 7.

On the other hand, when the required load is between $L_1$ and $L_2$ as explained above, the fuel injection is performed divided into two. In this case, a lean air-fuel mixture is formed in the combustion chamber 5 by the first fuel injection Q1 performed at the start of the suction stroke. Next, an air-fuel mixture of an optimal concentration is formed around the spark plug 7 by the second fuel injection Q2 performed at the end of the compression stroke. This air-fuel mixture is ignited by the spark plug 7. Due to the ignition flame, the lean air-fuel mixture is burned.

On the other hand, when the required load L is larger than $L_2$, as shown in FIG. 4, a uniform air-fuel mixture of a lean or stoichiometric air-fuel ratio or rich air-fuel ratio is formed inside the combustion chamber 5. This uniform air-fuel mixture is burned by the spark plug 7.

Next, a general explanation will first be given of the method of reducing the unburned hydrocarbons according to the present invention while referring to FIG. 5. Note that in FIG. 5, the abscissa shows the crank angle, while BTDC and ATDC show before top dead center and after top dead center.

FIG. 5(A) shows the fuel injection timing when there is no particular need to reduce the unburned hydrocarbons by the method according to the present invention and the required load L is smaller than $L_1$. As shown in FIG. 5(A), at this time, only the main fuel Qm is injected at the end of the compression stroke. At this time, the exhaust control valve 24 is held in the fully opened state.

As opposed to this, when it is necessary to reduce the unburned hydrocarbons by the method according to the present invention, the exhaust control valve 24 is substantially fully closed. Further, as shown in FIG. 5(B), auxiliary fuel Qa is additionally injected during the expansion stroke, in the example shown in FIG. 5(B), near 60° after compression top dead center (ATDC), in addition to the injection of the main fuel Qm for generating the engine output. Note that in this case, the main fuel Qm is burned under excess air so that sufficient oxygen remains in the combustion chamber 5 for completely burning the auxiliary fuel Qa after burning the main fuel Qm. Further, FIG. 5(A) and FIG. 5(B) show the fuel injection timing when the engine load and engine speed are the same. Therefore, when the engine load and engine speed are the same, the amount of injection of the main fuel Qm in the case shown in FIG. 5(B) is increased compared with the amount of injection of main fuel Qm in the case shown in FIG. 5(A).

Figure 5:
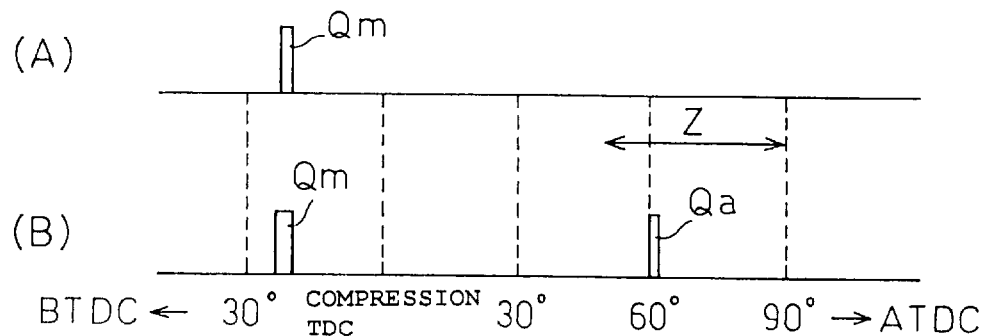
FIG. 5 is a view of the injection timing.
Figure 6:
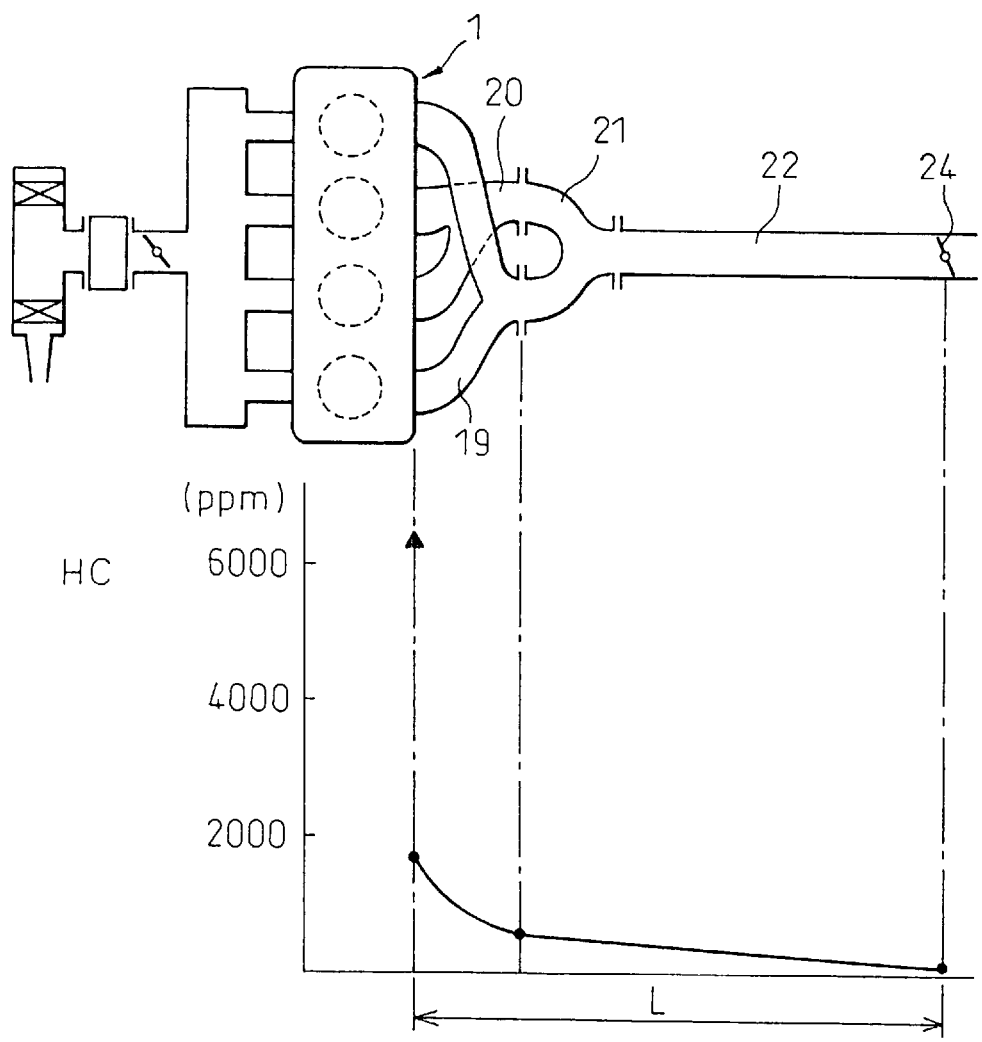
FIG. 6 is a view of the concentration of unburned hydrocarbons.

FIG. 6 shows an example of the concentration (ppm) of unburned hydrocarbons in the exhaust gas at different positions of the engine exhaust passage. In the example shown in FIG. 6, the black triangle shows the concentration (ppm) of the unburned hydrocarbons in the exhaust gas at the exhaust port 11 outlet in the case of injecting the main fuel Qm at the end of the compression stroke as shown in FIG. 5(A) in the state where the exhaust control valve 24 is fully closed. In this case, the concentration of the unburned hydrocarbons in the exhaust gas at the exhaust port 11 outlet becomes an extremely high value of at least 6000 ppm.

On the other hand, in the example shown in FIG. 6, the black dots and the solid line show the concentration (ppm) of the unburned hydrocarbons in the exhaust gas when substantially fully closing the exhaust control valve 24 and injecting main fuel Qm and auxiliary fuel Qa as shown in FIG. 5(B). In this case, the concentration of the unburned hydrocarbons in the exhaust gas at the exhaust port 11 outlet becomes not more than 2000 ppm. Near the exhaust control valve 24, the concentration of the unburned hydrocarbons in the exhaust gas falls to about 150 ppm. Therefore, in this case, it is learned that the amount of the unburned hydrocarbons exhausted into the atmosphere is greatly reduced.

The reason why the unburned hydrocarbons are reduced in the exhaust passage upstream of the exhaust control valve 24 in this way is that the oxidation reaction of the unburned hydrocarbons is promoted. As shown by the black triangle of FIG. 6, when the amount of the unburned hydrocarbons at the exhaust port 11 outlet is large, that is, when the amount of generation of unburned. hydrocarbons in the combustion chamber 5 is large, even if the oxidation reaction of the unburned hydrocarbons in the exhaust passage is promoted, the amount of the unburned hydrocarbons exhausted into the atmosphere does not fall that much. That is, the amount of unburned hydrocarbons exhausted into the atmosphere can be greatly reduced by the promotion of the oxidation reaction of the unburned hydrocarbons in the exhaust passage when the concentration of unburned hydrocarbons at the exhaust port 11 outlet is low, that is, the amount of generation of unburned hydrocarbons in the combustion chamber 5 is small, as shown by the black dots of FIG. 6.

To reduce the amount of unburned hydrocarbons exhausted into the atmosphere in this way, it is necessary to simultaneously satisfy the two requirements of reducing the amount of generation of unburned hydrocarbons in the combustion chamber 5 and promoting the oxidation reaction of the unburned hydrocarbons in the exhaust passage. Therefore, first, an explanation will be given of the second requirement, that is, the promotion of the oxidation reaction of the unburned hydrocarbons in the exhaust passage.

According to the present invention, the exhaust control valve 24 is substantially fully closed when the amount of unburned hydrocarbons exhausted into the atmosphere should be reduced. When the exhaust control valve 24 is substantially fully closed in this way, the pressure inside the exhaust port 11, inside the exhaust manifolds 19 and 20, inside the exhaust pipe 21, and inside the exhaust pipe 22 upstream of the exhaust control valve 24, that is, the back pressure, becomes considerably high. The fact that the back pressure becomes high means that the pressure of the exhaust gas will not fall that much when the exhaust gas is exhausted into the exhaust port 11 from the combustion chamber 5 and therefore the temperature of the exhaust gas exhausted from the combustion chamber 5 will also not fall that much. Therefore, the temperature of the exhaust gas exhausted into the exhaust port 11 is maintained at a considerably high temperature. On the other hand, the fact that the back pressure is high means that the density of the exhaust gas is high. The fact that the density of the exhaust gas is high means that the flow rate of the exhaust gas in the exhaust passage from the exhaust port 11 to the exhaust control valve 24 is slow. Therefore, the exhaust gas exhausted into the exhaust port 11 remains in the exhaust passage upstream of the exhaust control valve 24 under a high temperature over a long time period.

When the exhaust gas is made to remain in the exhaust passage upstream of the exhaust control valve 24 under a high temperature for a long time period, the oxidation reaction of the unburned hydrocarbons is promoted during that time. In this case, according to experiments by the present inventors, it was found that to promote the oxidation reaction of the unburned hydrocarbons in the exhaust passage, it is necessary to make the temperature of the exhaust gas at the exhaust port 11 outlet at least about 750° C., preferably at least 800° C.

Further, the longer the time where the high temperature exhaust gas remains in the exhaust passage upstream of the exhaust control valve 24, the greater the amount of reduction of unburned hydrocarbons. The time where it remains there becomes longer the further the position of the exhaust control valve 24 from the exhaust port 11 outlet. Therefore, the exhaust control valve 24 has to be arranged away from the exhaust port 11 outlet by a distance necessary for sufficiently reducing the unburned hydrocarbons. If arranging the exhaust control valve 24 away from the exhaust port 11 outlet by a distance necessary for sufficiently reducing the unburned hydrocarbons, the concentration of unburned hydrocarbons is greatly reduced as shown by the solid line in FIG. 6. Note that according to experiments by the present inventors, it was found that to sufficiently reduce the unburned hydrocarbons, it is preferable to make the distance from the exhaust port 11 outlet to the exhaust control valve 24 at least 30 cm.

To promote the oxidation reaction of the unburned hydrocarbons in the exhaust passage as explained above, however, it is necessary to make the temperature of the exhaust gas at the exhaust port 11 outlet at least about 750° C., preferably at least 800° C. Further, to reduce the amount of unburned hydrocarbons exhausted into the atmosphere, it is necessary to satisfy the first requirement explained above. That is, it is necessary to reduce the amount of generation of unburned hydrocarbons in the combustion chamber 5. Therefore, in the present invention, in addition to the main fuel Qm for generating the engine output, the auxiliary fuel Qa is additionally injected after the injection of the main fuel Qm and the auxiliary fuel Qa burned in the combustion chamber 5.

That is, if the auxiliary fuel Qa is burned in the combustion chamber 5, the large amount of unburned hydrocarbons remaining after burning the main fuel Qm is burned at the time of burning the auxiliary fuel Qa. Further, this auxiliary fuel Qa is injected into the high temperature gas, so the auxiliary fuel Qa is burned well. Therefore, the unburned hydrocarbons remaining after burning the auxiliary fuel Qa is no longer generated that much. Therefore, the amount of the unburned hydrocarbons finally generated in the combustion chamber becomes considerably small.

Further, if the auxiliary fuel Qa is burned in the combustion chamber 5, in addition to the heat due to the combustion of the main fuel Qm itself and the auxiliary fuel Qa itself, the heat of combustion of the unburned hydrocarbons remaining after burning the main fuel Qm is additionally generated, so the temperature of the burned gas in the combustion chamber 5 becomes considerably high. By additionally injecting auxiliary fuel Qa and burning the auxiliary fuel Qa in addition to the main fuel Qm, it is possible to reduce the amount of the unburned hydrocarbons generated in the combustion chamber 5 and make the temperature of the exhaust gas in the exhaust port 11 outlet at least 750° C., preferably at least 800° C.

In this way, in the present invention, it is necessary to burn the auxiliary fuel Qa in the combustion chamber 5. Therefore, it is necessary that sufficient oxygen remain in the combustion chamber 5 at the time of combustion of the auxiliary fuel Qa. Further, it is necessary to inject auxiliary fuel Qa at the timing when the injected auxiliary fuel Qa would be burned well in the combustion chamber 5.

Therefore, in the present invention, as explained above, the main fuel Qm is burned under excess air so that sufficient oxygen can remain in the combustion chamber 5 at the time of combustion of the auxiliary fuel Qa. At this time, the auxiliary fuel Qa is also burned under excess air. In this case, it was found that the mean air-fuel ratio in the combustion chamber 5 at the time of combustion of the main fuel Qm is preferably at least about 30, while the mean air-fuel ratio in the combustion chamber 5 at the time of combustion of the auxiliary fuel Qa is preferably at least about 15.5.

Further, in a stratified combustion type internal combustion engine shown in FIG. 2, the injection timing when the auxiliary fuel Qa injected would burn well in the combustion chamber 5 is an expansion stroke from about 50° to about 90° after compression top dead center (ATDC) shown by the arrow mark Z in FIG. 5. Therefore, in a stratified combustion type internal combustion engine shown in FIG. 2, the auxiliary fuel Qa is injected in the expansion stroke from about 50° to about 90° after compression top dead center (ATDC). Note that the auxiliary fuel Qa injected in the expansion stroke of about 50° to about 90° after compression top dead center (ATDC) does not contribute that much to the generation of the engine output.

According to experiments of the present inventors, however, in a stratified combustion type internal combustion engine shown in FIG. 2, when auxiliary fuel Qa is injected from 60° to 70° after compression top dead center (ATDC), the amount of the unburned hydrocarbons exhausted into the atmosphere becomes the smallest. Therefore, in this embodiment according to the present invention, as shown in FIG. 5(B), the injection timing of the auxiliary fuel Qa is made near about 60° after compression top dead center (ATDC).

The optimal injection timing of the auxiliary fuel Qa differs depending on the type of the engine. For example, in a diesel engine, the optimal injection timing for the auxiliary fuel Qa is during the expansion stroke or during the exhaust stroke. Therefore, in the present invention, the injection of the auxiliary fuel Qa is carried out in the expansion stroke or the exhaust stroke.

On the other hand, the temperature of the burned gas in the combustion chamber 5 is influenced by both of the heat of combustion of the main fuel Qm and the heat of combustion of the auxiliary fuel Qa. That is, the temperature of the burned gas in the combustion chamber 5 becomes higher the greater the amount of injection of the main fuel Qm and becomes higher the greater the amount of injection of the auxiliary fuel Qa. Further, the temperature of the burned gas in the combustion chamber 5 is influenced by the back pressure. That is, the higher the back pressure, the harder it is for the burned gas to flow out from the inside of the combustion chamber 5, so the greater the amount of burned gas remaining in the combustion chamber 5. Therefore, if the exhaust control valve 24 is substantially fully closed, the temperature of the burned gas in the combustion chamber 5 is raised.

If the exhaust control valve 25 is substantially fully closed, however, and therefore the back pressure becomes higher, even if auxiliary fuel Qa were additionally injected, the torque generated by the engine would fall from the optimum required generated torque. Therefore, in the present invention, when the exhaust control valve 24 is substantially fully closed such as shown in FIG. 5(B), the amount of injection of the main fuel Qm is increased compared with the case where the exhaust control valve 24 is fully opened under the same engine operating state so as to approach the required generated torque of the engine when the exhaust control valve 24 is fully opened under the same engine operating state as shown in FIG. 5(B). Note that in this embodiment of the present invention, when the exhaust control valve 24 is substantially fully closed, the main fuel Qm is increased so that the torque generated by the engine at that time matches the required generated torque of the engine when the exhaust control valve 24 is fully opened under the same engine operating state.

Figure 7:
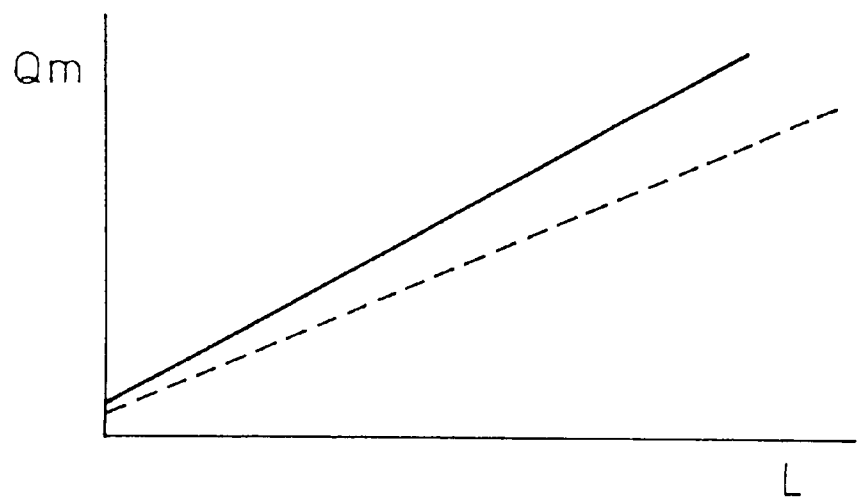
FIG. 7 is a view of the amount of injection of main fuel.

FIG. 7 shows the change in the main fuel. Qm required for obtaining the required generated torque of the engine with respect to the required load L. Note that in FIG. 7, the solid line shows the case where the exhaust control valve 24 is substantially fully closed, while the broken line shows the case where the exhaust control valve 24 is fully opened.

Figure 8:
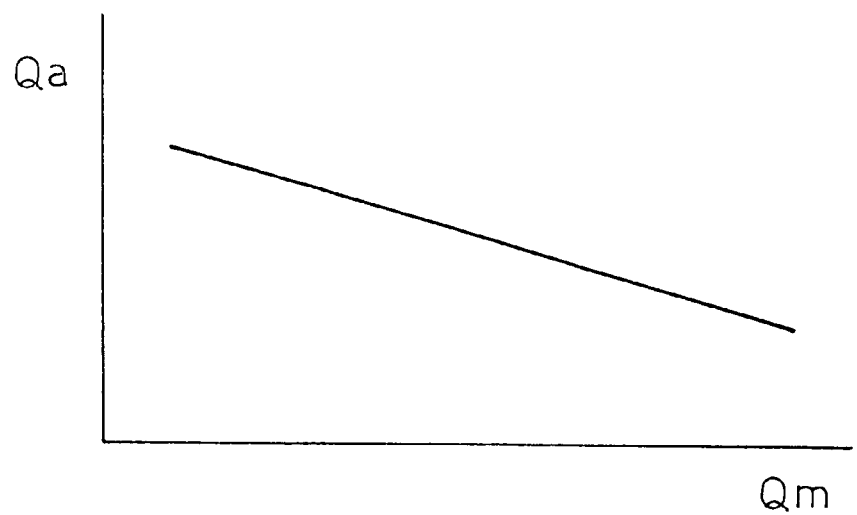
FIG. 8 is a view of the relationship between the amount of injection of main fuel and the amount of injection of auxiliary fuel.

On the other hand, FIG. 8 shows the relationship of the main fuel Qm and auxiliary fuel Qa required for making the temperature of the exhaust gas at the exhaust port 11 outlet about 750° C. to about 800° C. when substantially fully closing the exhaust control valve 24. As explained above, if increasing the main fuel Qm, the temperature of the burned gas in the combustion chamber 5 becomes higher, while if the auxiliary fuel Qa is increased, the temperature of the burned gas in the combustion chamber 5 becomes higher. Therefore, the relationship between the main fuel Qm and auxiliary fuel Qa required for making the temperature of the exhaust gas at the exhaust port 11 outlet from about 750° C. to about 800° C. becomes one as shown in FIG. 8, where if increasing the main fuel Qm, the auxiliary fuel Qa is decreased, while if decreasing the main fuel Qm, the auxiliary fuel Qa is increased.

If increasing the main fuel Qm and auxiliary fuel Qa by the same amount, however, the amount of rise of temperature inside the combustion chamber 5 becomes far greater in the case of increasing the auxiliary fuel Qa than the case of increasing the main fuel Qm. Therefore, seen from the viewpoint of the reduction of the amount of fuel consumption, it can be said to be preferable to raise the temperature of the burned gas in the combustion chamber 5 by increasing the auxiliary fuel Qa.

Therefore, in this embodiment of the present invention, when substantially closing the exhaust control valve 24, the main fuel Qm is increased by exactly the amount required for raising the torque generated by the engine to the required generated torque so as to raise the temperature of the burned gas in the combustion chamber 5 due to the heat of combustion of mainly the auxiliary fuel Qa.

If substantially closing the exhaust control valve 24 and injecting the amount of auxiliary fuel Qa required for making the exhaust gas in the exhaust port 11 outlet at least about 750° C., preferably at least about 800° C., the concentration of the unburned hydrocarbons can be greatly reduced in the exhaust passage from the exhaust port 11 to the exhaust control valve 24. At this time, to reduce the concentration of the unburned hydrocarbons down to about 150 ppm as shown in FIG. 6 in the exhaust passage from the exhaust port 11 to the exhaust control valve 24, it is necessary to make the pressure in the exhaust passage upstream of the exhaust control valve 24 from about 60 KPa to 80 KPa by gauge pressure. The rate of closure of the sectional area of the exhaust passage by the exhaust control valve 24 at this time is about 95 percent.

Figure 3:
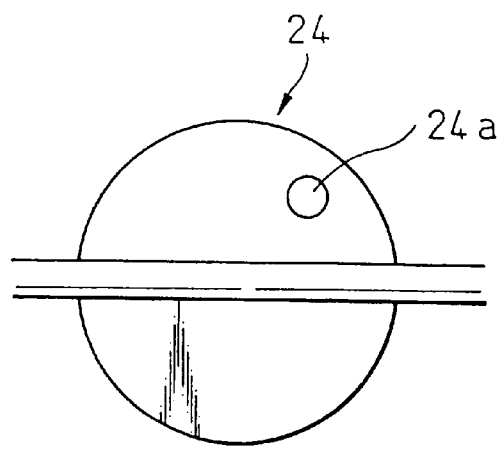
FIG. 3 is a view of an embodiment of an exhaust control valve.

Therefore, in the embodiment shown in FIG. 1, when greatly reducing the amount of exhaust of unburned gas into the atmosphere, the exhaust control valve 24 is substantially fully closed so that the rate of closure of the sectional area of the exhaust passage by the exhaust control valve 24 becomes about 95 percent. Note that in this case, as shown in FIG. 3, it is possible to make a through hole 24a in the valve element of the exhaust control valve 24 and completely close the exhaust control valve 24.

On the other hand, when it is sufficient to reduce the unburned hydrocarbons from 600 ppm to about 800ppm in the exhaust passage from the export port 11 to the exhaust control valve 24, it is sufficient to make the pressure of the exhaust passage upstream of the exhaust control valve 24 about 30 KPa by gauge pressure. The rate of closure of the sectional area of the exhaust passage by the exhaust control valve 24 at this time becomes about 90 percent.

A large amount of unburned hydrocarbons is generated at the internal combustion engine when the temperature of the combustion chamber 5 is low. The times when the temperature in the combustion chamber 5 is low are the time of engine startup and warmup operation and the time of engine low load. Therefore, at the time of engine startup and warmup operation and the time of engine low load, a large amount of unburned hydrocarbons is generated. When the temperature in the combustion chamber 5 is low in this way, even if arranging a catalyst having an oxidation function in the exhaust passage, it is difficult to oxidize the large amount of unburned hydrocarbons generated by a catalyst except when the catalyst becomes over an activation temperature.

Therefore, in this embodiment of the present invention, at the time of engine startup and warmup operation and the time of engine low load, the exhaust control valve 24 is substantially fully closed, the main fuel Qm is increased, the auxiliary fuel Qa is additionally injected, and therefore the amount of unburned hydrocarbons exhausted into the atmosphere is greatly reduced.

Figure 9:
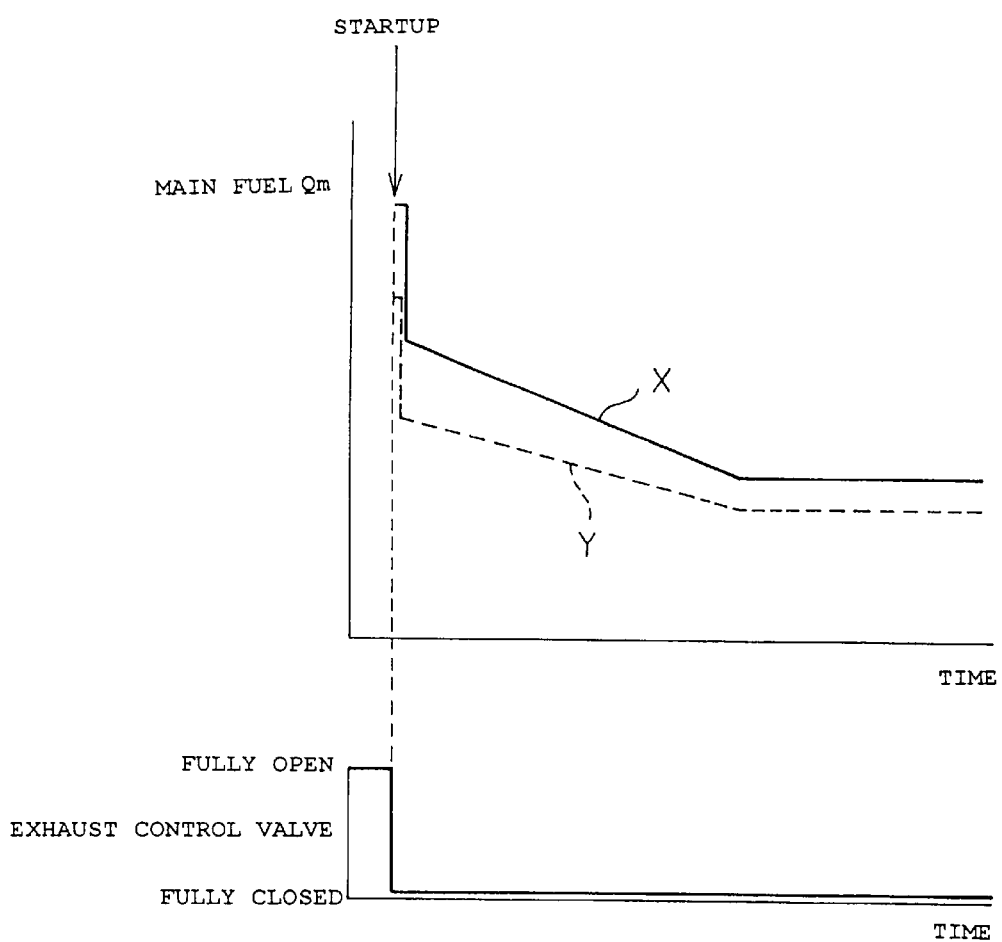
FIG. 9 is a view of the amount of injection of main fuel and the change in opening degree of the exhaust control valve.

FIG. 9 shows an example of the change of the main fuel Qm at the time of engine startup and warmup operation and the change in the opening degree of the exhaust control valve 24. Note that in FIG. 9, the solid line X shows the optimum amount of injection of the main fuel Qm when substantially fully closing the exhaust control valve 24, while the broken line Y shows the optimum amount of injection of main fuel Qm when fully opening the exhaust control valve 24. As will be understood from FIG. 9, when the engine is started, the exhaust control valve 24 is switched from the fully opened state to the substantially fully closed state, the amount of injection X of the main fuel Qm is increased from the optimum amount of injection Y of the main fuel Qm when the exhaust control valve 24 is fully opened under the same engine operating conditions, and the auxiliary fuel Qa is additionally injected.

Figure 10:
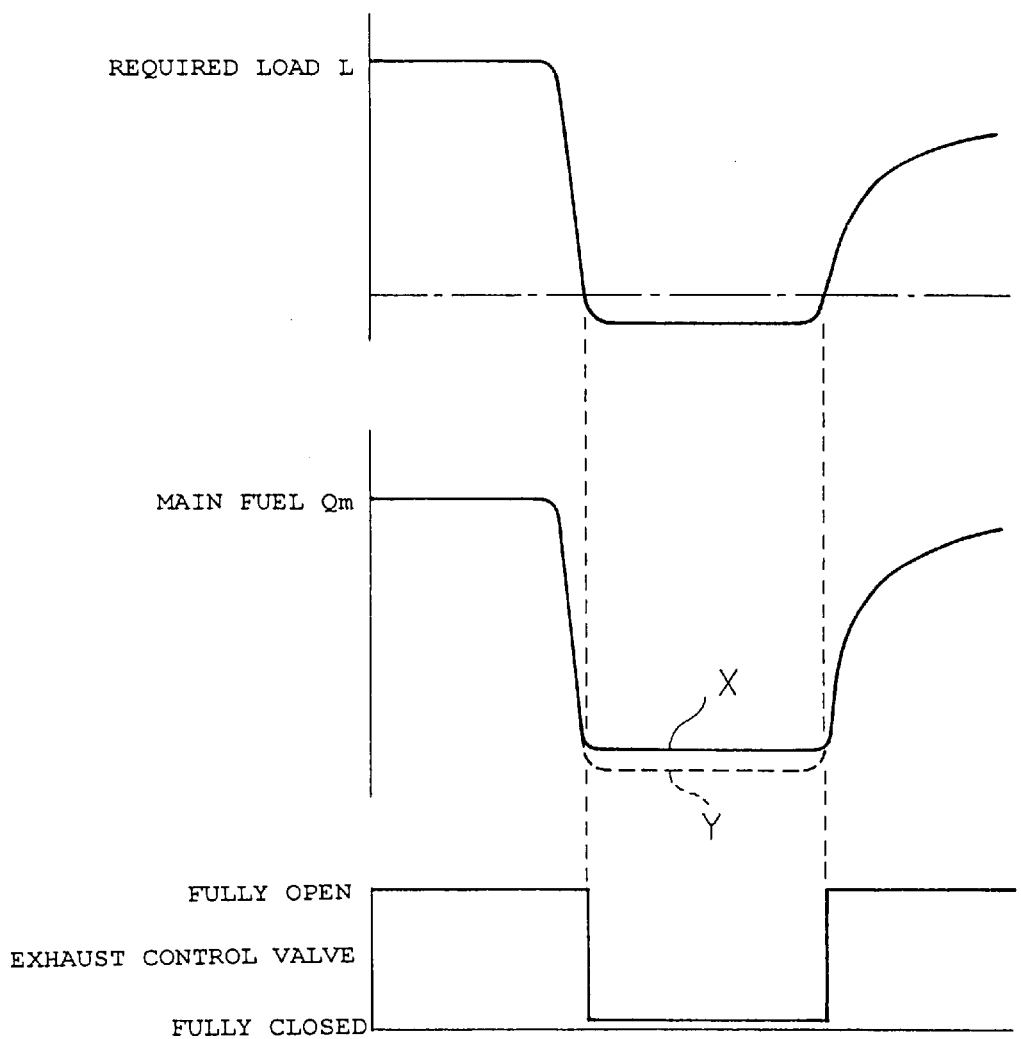
FIG. 10 is a view of the amount of injection of main fuel and the change in opening degree of the exhaust control valve.

FIG. 10 shows an example of the change of the main fuel Qm at the time of engine low load and the change in the opening degree of the exhaust control valve 24. Note that in FIG. 10, the solid line X shows the optimum amount of injection of the main fuel Qm when substantially fully closing the exhaust control valve 24, while the broken line Y shows the optimum amount of injection of main fuel Qm when fully opening the exhaust control valve 24. As will be understood from FIG. 10, at the time of engine low load, the exhaust control valve 24 is substantially fully closed, the amount of injection X of the main fuel Qm is increased from the optimum amount of injection Y of the main fuel Qm when the exhaust control valve 24 is fully opened under the same engine operating conditions, and the auxiliary fuel Qa is additionally injected.

Figure 11:
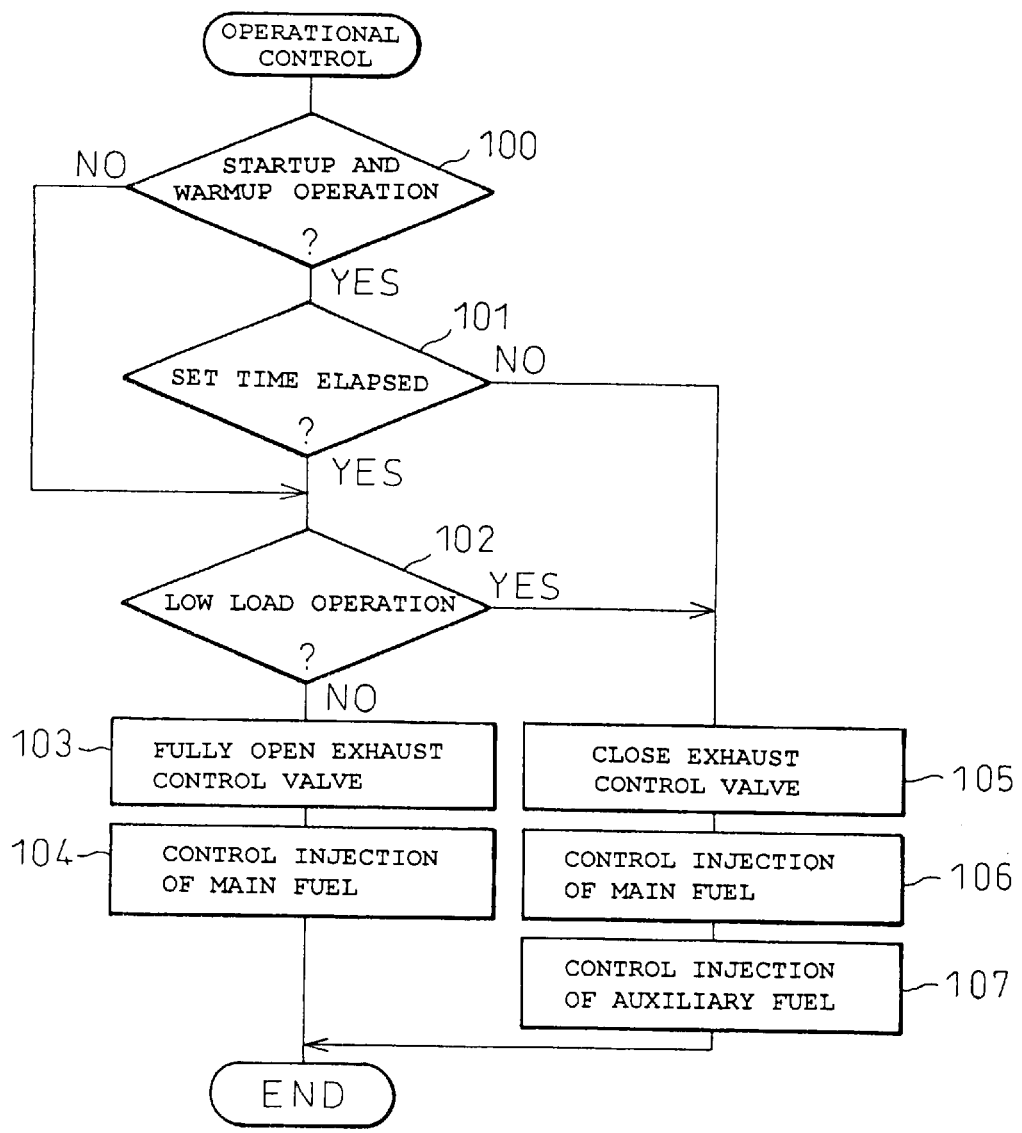
FIG. 11 is a flow chart of the operational control.

FIG. 11 shows a routine of the operational control.

Referring to FIG. 11, first, at step 100, it is determined if the engine is starting up and in warmup operation. When the engine is not starting up and in warmup operation, the routine jumps to step 102, where it is determined if the engine is operating under low load. When the engine is not operating under low load, the routine proceeds to step 103, where the exhaust control valve 24 is fully opened, then the routine proceeds to step 104, where the injection of the main fuel Qm is controlled. At this time, the auxiliary fuel Qa is not injected.

On the other hand, when it is determined at step 100 that the engine is starting up and in warmup operation, the routine proceeds to step 101, where it is determined if a predetermined set time has elapsed from engine startup. When a set time has not elapsed, the routine proceeds to step 105. On the other hand, when the set time has elapsed, the routine proceeds to step 102. When it is determined at step 102 that the engine is operating. under low load, the routine proceeds to step 105. At step 105, the exhaust control valve 24 is substantially fully closed, then at step 106, the injection of the main fuel Qm is controlled. That is, if the engine is starting up and in warmup operation, the amount of injection of the main fuel Qm is made the X shown in FIG. 9. If the engine is operating under low load, the amount of injection of the main fuel Qm is made the X shown in FIG. 10. Next, at step 107, the injection of the auxiliary fuel Qa is controlled.

Figure 12:
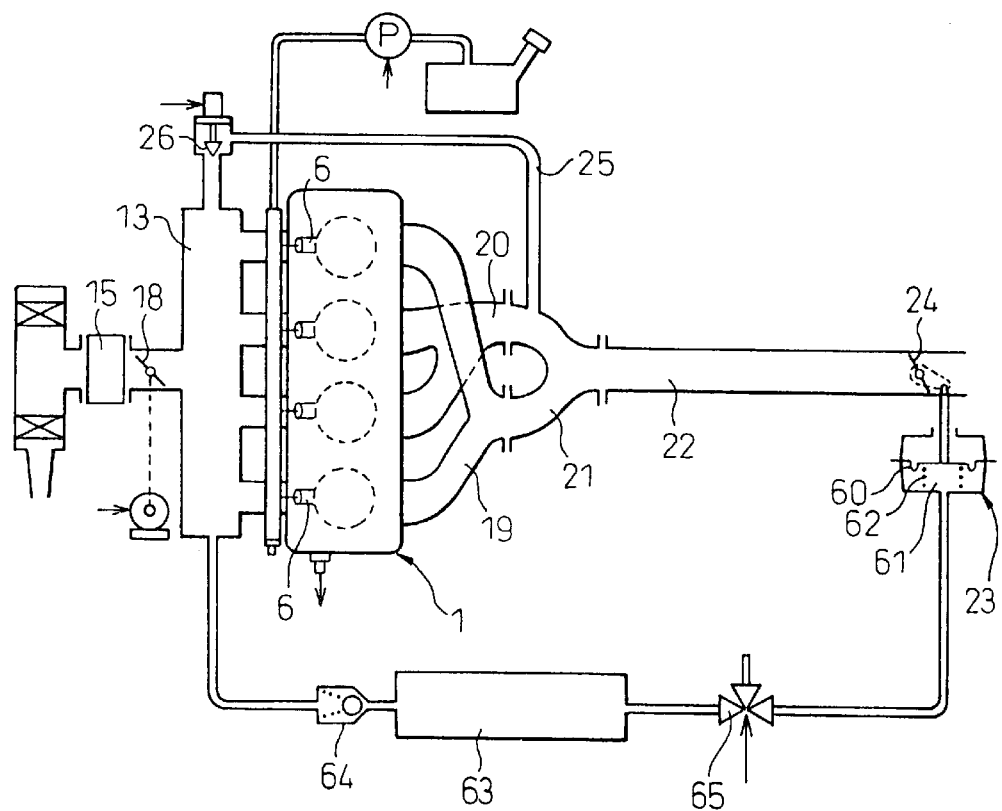
FIG. 12 is an overview of another embodiment of an internal combustion engine.

FIG. 12 shows the case of use of a vacuum operated type actuator as the actuator 23. Note that in the example shown in FIG. 12, as the vacuum operated type actuator, use is made of a vacuum operated diaphragm device comprised of a diaphragm 60 connected to the exhaust control valve 24, a diaphragm vacuum chamber 61, and a diaphragm pressing compression spring 62. Further, the vacuum tank 63 is on the one hand connected to the inside of the surge tank 13 through a check valve 64 enabling flow only toward the surge tank 13 and on the other hand connected to the diaphragm vacuum chamber 61 through a changeover valve 65 able to communicate with the atmosphere.

If the level of vacuum in the surge tank 13 becomes larger than the level of vacuum in the vacuum tank 63, the check valve 64 opens and therefore the inside of the vacuum tank 63 is maintained at the maximum level of vacuum generated in the surge tank 13. When the diaphragm vacuum chamber 61 is opened to the atmosphere by the switching action of the changeover valve 65, the exhaust control valve 24 is fully opened. When the diaphragm vacuum chamber 61 is connected to the inside of the vacuum tank 63 due to the switching action of the changeover valve 65, the exhaust control valve 24 is substantially fully closed.

When the engine is stopped, the exhaust control valve 24 is held in the fully opened state so as not to be fixed in the closed state. Next, at the time of engine startup, the exhaust control valve 24 is switched from the fully opened state to the substantially fully closed state. In the example shown in FIG. 12, even at the time when the engine is stopped, vacuum is accumulated in the vacuum tank 63. Therefore, at the time of engine startup, by connecting the diaphragm vacuum chamber 61 to the vacuum tank 63, the exhaust control valve 24 can be reliably switched from the fully opened state to the substantially fully closed state.

Figure 13:
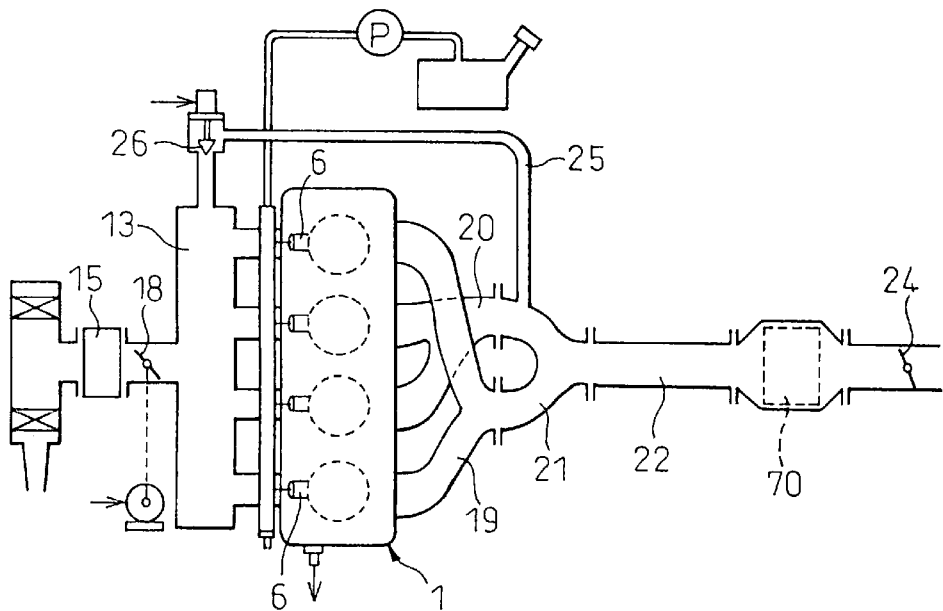
FIG. 13 is an overview of still another embodiment of an internal combustion engine.

FIG. 13 shows another embodiment. In this embodiment, a catalyst 70 is arranged in the exhaust pipe 22 upstream of the exhaust control valve 24. When a catalyst 70 is arranged in the exhaust pipe 22 upstream of the exhaust control valve 24 in this way, if auxiliary fuel Qa is additionally injected and the exhaust control valve 24 is substantially fully closed, the catalyst 70 is strongly heated by the high temperature exhaust gas. Therefore, at the time of engine startup and warmup operation, the catalyst 70 can be activated early.

As the catalyst 70 arranged in the exhaust pipe 22, it is possible to use an oxidation catalyst, three-way catalyst, $NO_x$ absorbent, or hydrocarbon absorbinq catalyst. The $NO_x$ absorbent has the function of absorbing the $NO_x$ when the mean air-fuel ratio in the combustion chamber 5 is lean and releasing the $NO_x$ when the mean air-fuel ratio in the combustion chamber 5 becomes rich.

The $NO_x$ absorbent is for example comprised of alumina as a carrier and carries on the carrier for example at least one of an alkali metal such as potassium K, sodium Na, lithium Li, and cesium Cs, an alkali earth such as barium Ba and calcium Ca, and a rare earth such as lanthanum La and yttrium Y and a precious metal such as platinum Pt.

On the other hand, the hydrocarbon absorbing catalyst is for example comprised of a porous carrier such as zeolite, alumina $Al_2O_3$, silica alumina $SiO_2·Al_2O_3$, activated carbon, and titania $TiO_2$ on which is carried a precious metal such as platinum Pt, palladium Pd, rhodium Rh, and iridium Ir or a transition metal such as copper Cu, iron Fe, cobalt Co, and nickel Ni.

In such a hydrocarbon absorbing catalyst, the unburned hydrocarbons in the exhaust gas are physically absorbed in the catalyst. The amount of absorption of the unburned hydrocarbons increases the lower the temperature of the catalyst and increases the higher the pressure of the exhaust gas flowing through the catalyst. Therefore, in the embodiment shown in FIG. 13, when the temperature of the catalyst 70 is low and the back pressure is increased due to the exhaust throttling action of the exhaust control valve 24, that is, at the time of engine startup and warmup operation and at the time of engine low load operation, the unburned hydrocarbons contained in the exhaust gas are absorbed in the hydrocarbon absorbing catalyst. Therefore, it is possible to further reduce the amount of unburned hydrocarbons exhausted into the atmosphere. Note that the unburned hydrocarbons absorbed in the hydrocarbon absorbing catalyst are released from the hydrocarbon absorbing catalyst when the back pressure becomes low or when the temperature of the hydrocarbon absorbing catalyst becomes higher.

Figure 14:
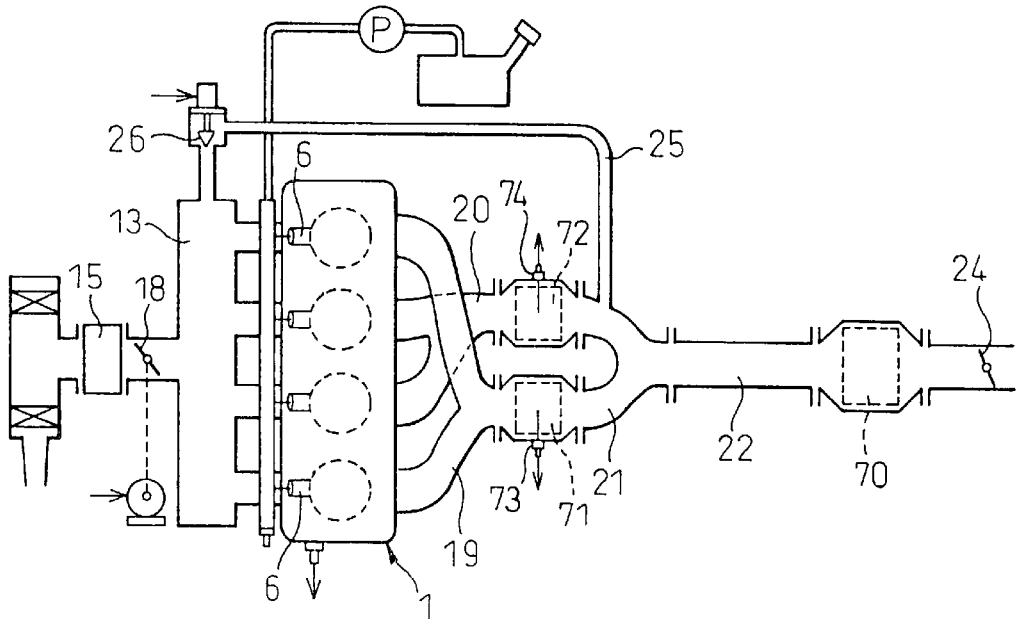
FIG. 14 is an overview of still another embodiment of an internal combustion engine.

FIG. 14 shows still another embodiment. In this embodiment, the catalyst 70 comprised of an $NO_x$ absorbent or hydrocarbon absorbing catalyst is arranged in the exhaust pipe 22 upstream of the exhaust control valve 24, while a catalyst 71 or 72 having an oxidation function such as an oxidation catalyst or three-way catalyst is arranged between the first exhaust manifold 19 and exhaust pipe 21 and the second exhaust manifold 20 and exhaust pipe 21. When the exhaust control valve 24 is substantially fully closed and the auxiliary fuel Qa is injected, the temperature of the exhaust gas at the outlets of the exhaust manifolds 19 and 20 is considerably high. Therefore, if catalysts 71 and 72 are arranged at the outlets of the exhaust manifolds 19 and 20, these catalysts 71 and 72 are activated an early time after engine startup. As a result, the amount of unburned hydrocarbons exhausted into the atmosphere is further reduced due to the action of the catalysts 71 and 72 on promoting the oxidation reaction.

As shown in FIG. 14, however, when arranging catalysts 71 and 72 having oxidation functions in the engine exhaust passage, even at the time of engine low load operation, the catalysts 71 and 72 are held at over the activation temperature so long as the engine low load operation does not continue for a long time. Further, when the engine is restarted in a short time after the engine stops, sometimes the catalysts 71 and 72 are held at above the activation temperature even though the engine is in warmup operation. If the catalysts 71 and 72 are activated, the unburned hydrocarbons in the exhaust gas are purified by the catalysts 71 and 72. Therefore, it is no longer necessary to inject auxiliary fuel Qa inviting an increase in the amount of fuel consumption.

Therefore, in a further embodiment, as shown in FIG. 14, catalysts 71 and 72 are attached to the temperature sensors 73 and 74 for detecting the temperatures of the catalysts 71 and 72 as shown in FIG. 14. When either of the catalysts 71 and 72 reaches more than the activation temperature based on the output signals of the temperature sensors 73 and 74, even at the time of warmup operation or engine low load operation, the exhaust control valve 24 is fully opened and the injection of the auxiliary fuel Qa is stopped.

Figure 15:
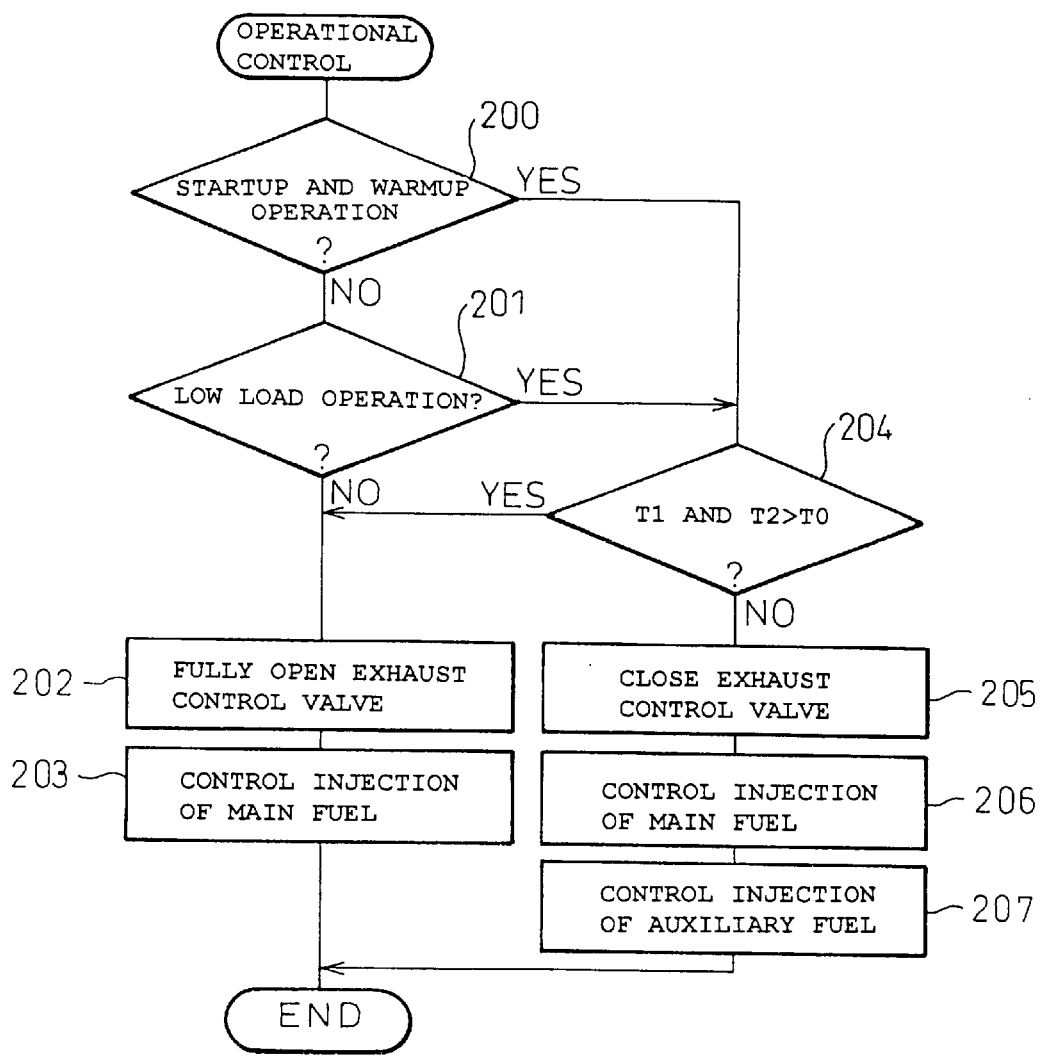
FIG. 15 is a flow chart of the operational control.

FIG. 15 shows a routine for operational control in such a case.

Referring to FIG. 15, first, at step 200, it is determined if the engine is starting up and in warmup operation. When the engine is not starting up and in warmup operation, the routine proceeds to step 201, where it is determined if the engine is operating under low load. When the engine is not operating under low load, the routine proceeds to step 202, where the exhaust control valve 24 is fully opened, then the routine proceeds to step 203, where the injection of the main fuel Qm is controlled. At this time, the auxiliary fuel Qa is not injected.

On the other hand, if it is judged at step 200 that the engine is starting up and in warmup operation or if it is determined at step 201 that the engine is operating under low load, the routine proceeds to step 204, where it is determined if the temperature T1 of the catalyst 71 detected by the temperature sensor 73 and the temperature T2 of the catalyst 72 detected by the temperature sensor 74 are higher than the activation temperature $T_0$. When $T1 \leq T_0$ or $T2 \leq T_0$, the routine proceeds to step 205, where the exhaust control valve 24 is substantially fully closed, then at step 206, the injection of the main fuel Qm is controlled. That is, at the time of engine startup and warmup operation, the amount of injection of the main fuel Qm is made the X shown in FIG. 9, while at the time of engine low load operation, the amount of injection of the main fuel Qm is made the X shown in FIG. 10. Next, at step 207, the injection of the auxiliary fuel Qa is controlled.

As opposed to this, when it is judged at step 204 that $T1 > T_0$ and $T2 > T_0$, that is, when both of the catalysts 71 and 72 are activated, the routine proceeds to step 202, where the exhaust control valve 24 is fully opened and then the routine proceeds to step 203, where the injection of the main fuel Qm is controlled.

On the other hand, as explained above, to greatly reduce the amount of unburned hydrocarbons exhausted into the atmosphere, it is necessary to make the temperature of the exhaust gas at the exhaust port 11 outlet at least about 750° C. Therefore, it is necessary to maintain the back pressure at about 60 KPa to 80 KPa. However, there is a danger that deposits in the exhaust pipe 22 will prevent the exhaust control valve 24 from closing up to the target opening degree and as a result the back pressure from becoming sufficiently high. Further, even if the exhaust control valve 24 closes up to the target opening degree, the area of the flow channel of the exhaust gas becomes smaller due to the deposits and as a result there is the danger that the back pressure will become too high.

Therefore, in the embodiment explained below, when the amount of exhaust of the unburned hydrocarbons into the atmosphere should be reduced, the combustion in the combustion chamber 5 is controlled so that the pressure or temperature of the exhaust gas in the exhaust passage upstream of the exhaust control valve 24 becomes the target value. Specifically speaking, if the amount of injection of at least one of the main fuel Qm and auxiliary fuel Qa is increased, the combustion pressure and combustion temperature in the combustion chamber 5 becomes higher and therefore the back pressure and temperature of the exhaust gas rises. Further, if the amount of intake air increases, the amount of exhaust gas increases, so the back pressure and temperature of the exhaust gas rise.

Figure 16:
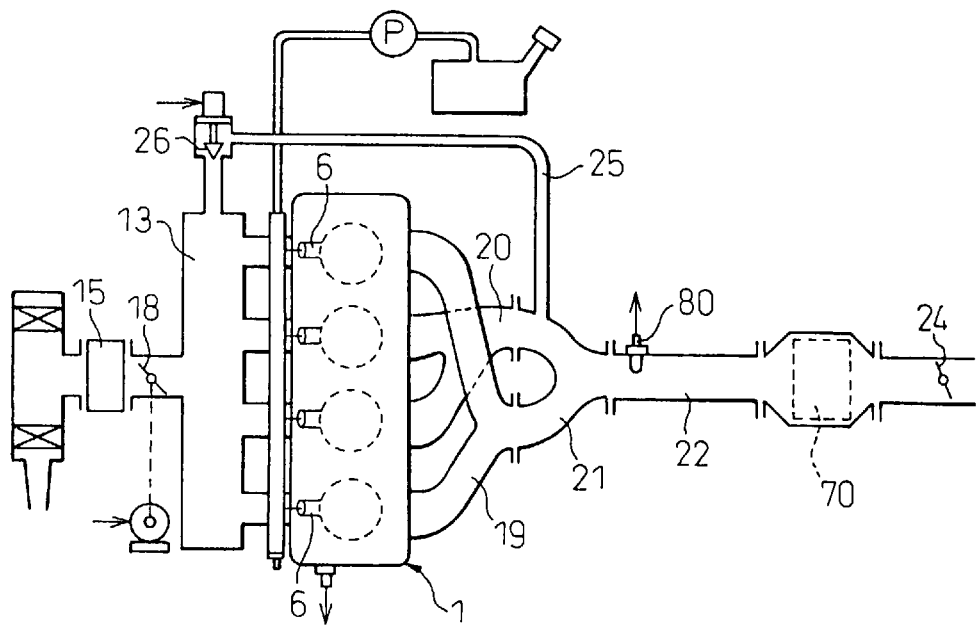
FIG. 16 is an overview of still another embodiment of an internal combustion engine.

Therefore, in the embodiment shown in FIG. 16, a pressure sensor 80 for detecting the back pressure is mounted in the exhaust pipe 22. When the back pressure is lower than a target value, the amount of injection of the main fuel Qm, the amount of injection of the auxiliary fuel Qa, or the amount of intake air is increased, while when the back pressure is higher than the target value, the amount of injection of the main fuel Qm, the amount of injection of the auxiliary fuel Qa, or the amount of intake air is decreased.

Figure 17:
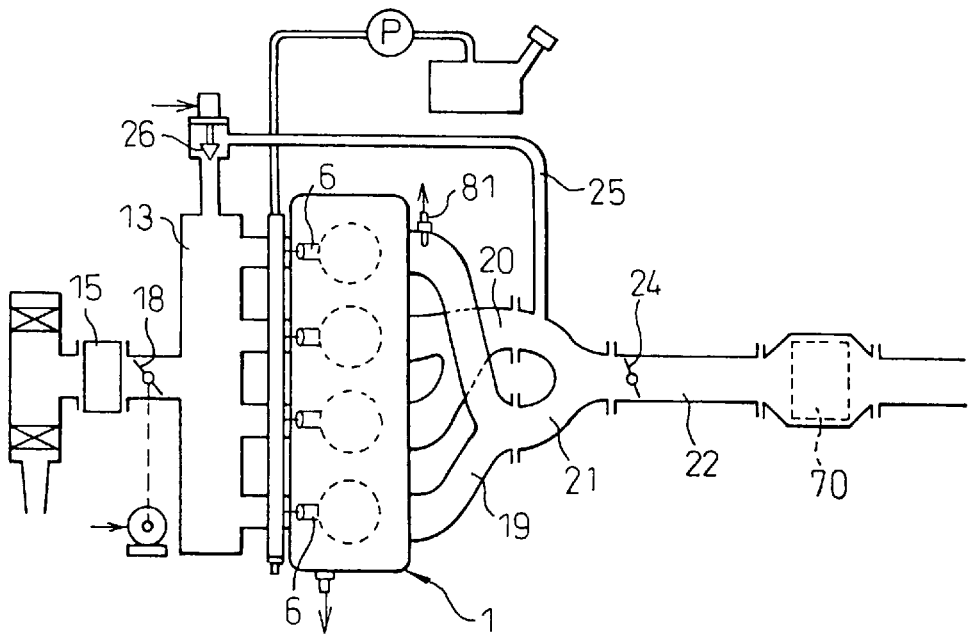
FIG. 17 is an overview of still another embodiment of an internal combustion engine.

Further, in the embodiment shown in FIG. 17, a temperature sensor 81 for detecting the temperature of the exhaust gas at the exhaust port 11 outlet is attached in the tube of the first exhaust manifold 19. When the temperature of the exhaust gas detected by the temperature sensor 81 is lower than a target value, the amount of injection of the main fuel Qm, the amount of injection of the auxiliary fuel Qa, or the amount of intake air is increased, while when the temperature of the exhaust gas detected by the temperature sensor 81 is higher than the target value, the amount of injection of the main fuel Qm, the amount of injection of the auxiliary fuel Qa, or the amount of intake air is decreased.

Note that the exhaust control valve 24 can be arranged in the inlet of the exhaust pipe 22 as shown in FIG. 17 and can be arranged in the outlet of the exhaust pipe 21.

Figure 18:
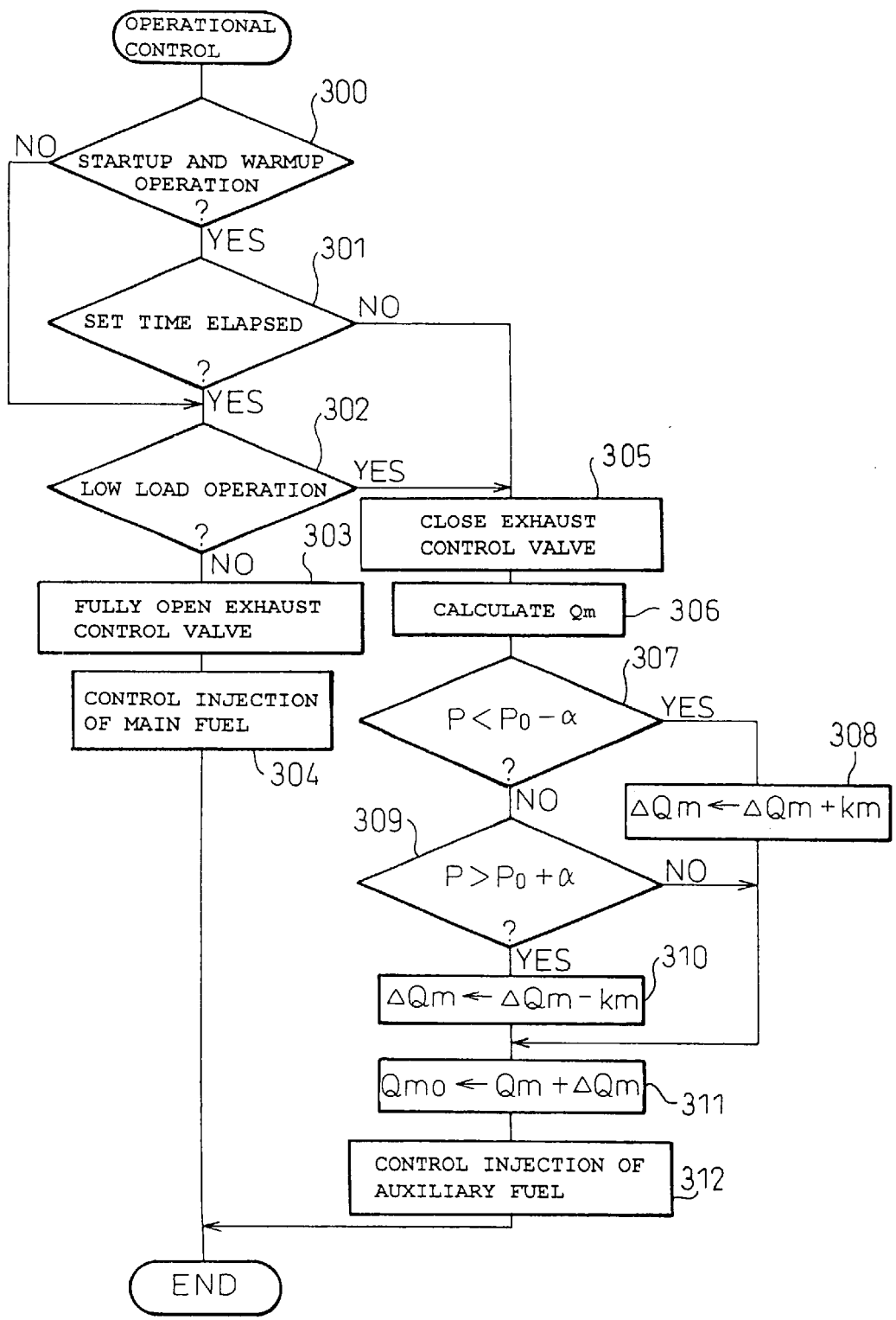
FIG. 18 is a flow chart of the operational control.

FIG. 18 shows the routine for operational control of the case when controlling the back pressure by controlling the main fuel Qm.

Referring to FIG. 18, first, at step 300, it is determined if the engine is starting up and in warmup operation. When the engine is not starting up and in warmup operation, the routine jumps to step 302, where it is determined that the engine is operating under low load. When the engine is not operating under low load, the routine proceeds to step 303, where the exhaust control valve 24 is fully opened, then the routine proceeds to step 304, where the injection of the main fuel Qm is controlled. At this time, the auxiliary fuel Qa is not injected.

On the other hand, when it is judged at step 300 that the engine is starting up and in warmup operation, the routine proceeds to step 301, where it is determined if a predetermined set time has elapsed after engine startup. When the set time has not elapsed, the routine proceeds to step 305. On the other hand, when the set time has elapsed, the routine proceeds to step 302. When it is determined at step 302 that the engine is operating under low load as well, the routine proceeds to step 305. At step 305, the exhaust control valve 24 is substantially fully closed.

Next, at step 306, the amount of injection of main fuel Qm (X in FIG. 9 and FIG. 10) predetermined in accordance with the operating state of the engine is calculated. Next, at step 307, it is determined if the back pressure P detected by the pressure sensor 80 is lower than a value ($P_0-\alpha$) smaller than the target value $P_0$ by exactly a constant value $\alpha$. When $P<P_0-\alpha$, the routine proceeds to step 308, where a constant value km is added to the correction value $\Delta$Qm with respect to the main fuel Qm. On the other hand, when $P \geq P_0-\alpha$, the routine proceeds to step 309, where it is determined if the back pressure P is higher than a value ($P_0+\alpha$) larger than the target value $P_0$ by exactly a constant value $\alpha$. When $P>P_0+\alpha$, the routine proceeds to step 310, where a constant value km is subtracted from the correction value $\Delta$Qm.

Next, at step 311, the value of Qm plus $\Delta$Qm is made the final amount of injection $Qm_0$ of the main fuel. That is, when $P<P_0-\alpha$, the main fuel is increased. When $P>P_0+\alpha$, the main fuel is decreased. Due to this, the back pressure P is controlled so that $P_0-\alpha<P<P_0+\alpha$. Next, at step 312, the injection of the auxiliary fuel Qa is controlled.

Figure 19:
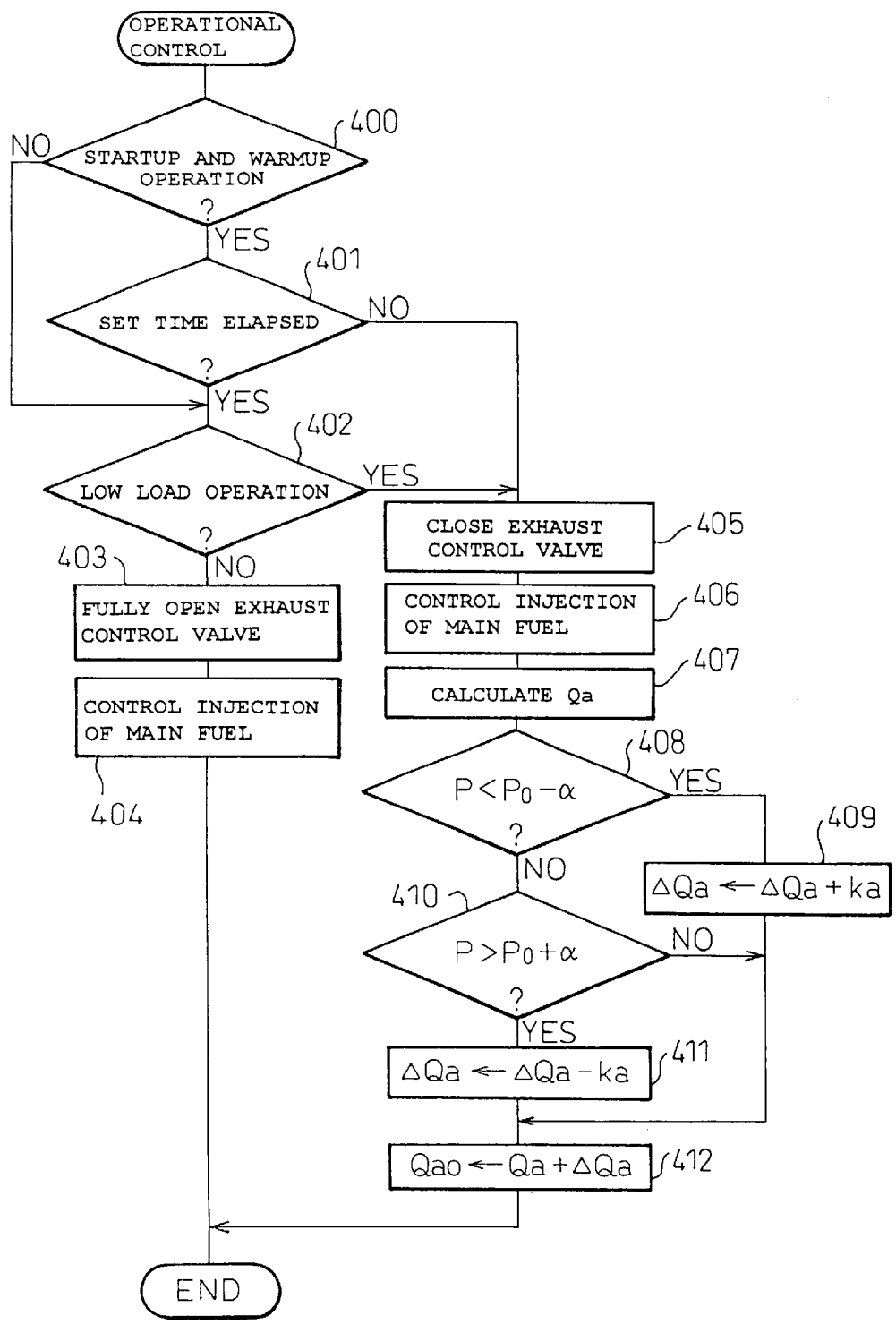
FIG. 19 is a flow chart of the operational control.

FIG. 19 shows the routine for operational control when controlling the back pressure by controlling the auxiliary fuel Qa.

Referring to FIG. 19, first, at step 400, it is determined if the engine is starting up and in warmup operation. When the engine is starting up and in warmup operation, the routine jumps to step 402, where it is determined if the engine is operating under low load. When the engine is not operating under low load, the routine proceeds to step 403, where the exhaust control valve 24 is fully opened, then the routine proceeds to step 404, where the injection of the main fuel Qm is controlled. At this time, the auxiliary fuel Qa is not injected.

On the other hand, when it is judged at step 400 that the engine is starting up and in warmup operation, the routine proceeds to step 401, where it is determined if a predetermined set time has elapsed from after engine startup. When the set time has not yet elapsed, the routine proceeds to step 405. On the other hand, when the set time has elapsed, the routine proceeds to step 402. When it is determined at step 402 that the engine is operating under low load, the routine proceeds to step 405. At step 405, the exhaust control valve 24 is substantially fully closed, then at step 406, the injection of the main fuel Qm is controlled. That is, if the engine is starting up and in warmup operation, the amount of injection of the main fuel Qm is made the X shown in FIG. 9, while when the engine is operating under low load, the amount of injection of the main fuel Qm is made the X shown in FIG. 10.

Next, at step 407, the amount of injection of auxiliary fuel Qa predetermined in accordance with the operating state of the engine is calculated. Next, at step 408, it is determined if the back pressure P detected by the pressure sensor 80 is lower than a value ($P_0-\alpha$) smaller than the target value $P_0$ by exactly a constant value $\alpha$. When $P<P_0-\alpha$, the routine proceeds to step 409, where a constant value ka is added to the correction value $\Delta$Qa for the auxiliary fuel Qa. On the other hand, when $P \geq P_0-\alpha$, the routine proceeds to step 410, where it is determined if the back pressure P is higher than a value ($P_0+\alpha$) larger than the target value $P_0$ by exactly a constant value a. When $P>P_0+\alpha$, the routine proceeds to step 411, where a constant value ka is subtracted from the correction value $\Delta$Qa.

Next, at step 412, the value of Qa plus $\Delta$Qa is made the final injection $Qa_0$ of auxiliary fuel. That is, when $P<P_0-\alpha$, the auxiliary fuel is increased, while when $P>P_0+\alpha$, the auxiliary fuel is decreased. Due to this, the back pressure is controlled so that $P_0-\alpha<P<P_0+\alpha$.

Figure 20:
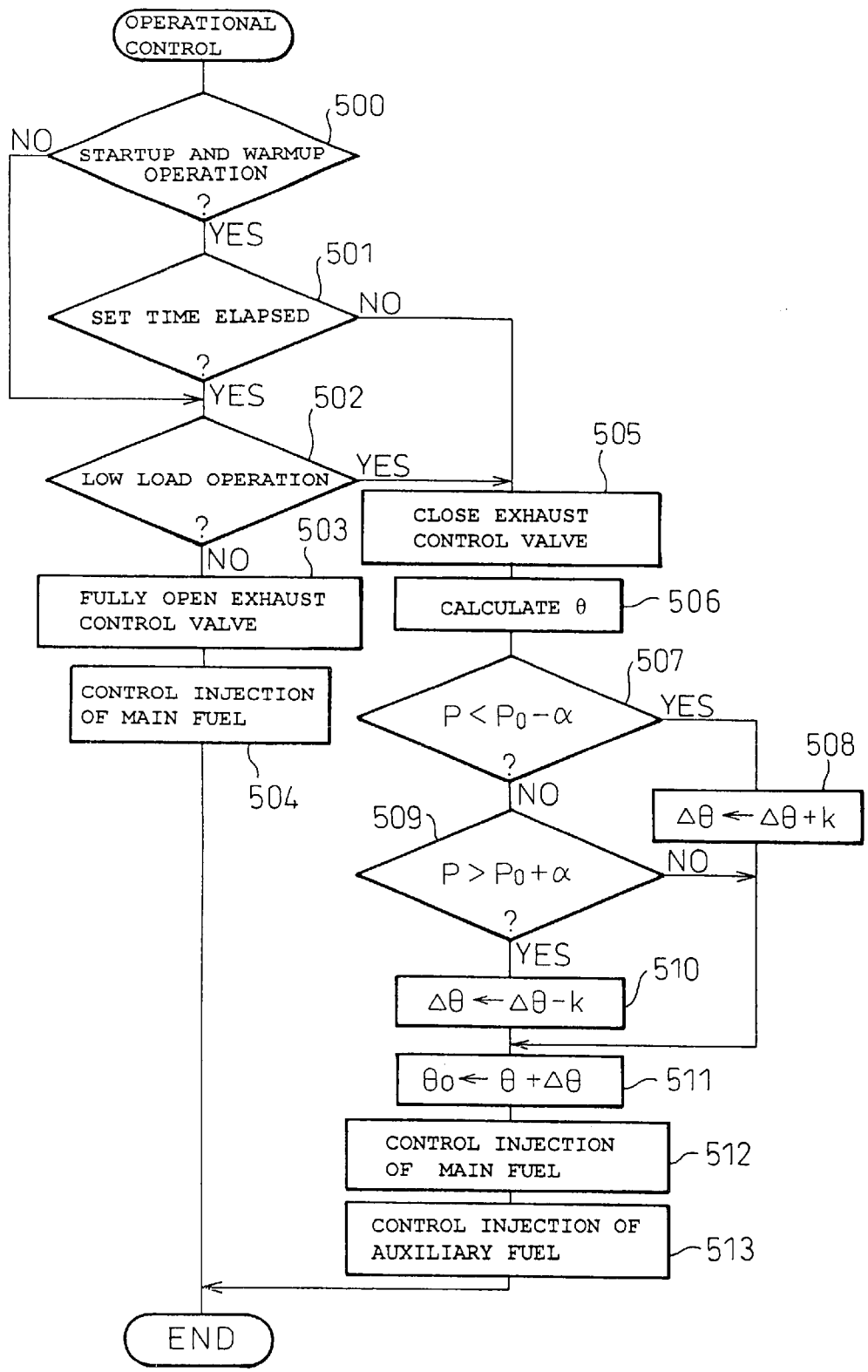
FIG. 20 is a flow chart of the operational control.

FIG. 20 shows a routine for operational control when controlling the back pressure by controlling the amount of intake air.

Referring to FIG. 20, first, at step 500, it is determined if the engine is starting up and in warmup operation. When the engine is starting up and in warmup operation, the routine jumps to step 502, where it is determined if the engine is operating under low load. When the engine is not operating under low load, the routine proceeds to step 503, where the exhaust control valve 24 is fully opened, then the routine proceeds to step 504, where the injection of the main fuel Qm is controlled. At this time, the auxiliary fuel Qa is not injected.

On the other hand, when it is judged at step 500 that the engine is starting up and in warmup operation, the routine proceeds to step 501, where it is determined if a predetermined set time has elapsed from after engine startup. When the set time has not yet elapsed, the routine proceeds to step 505. On the other hand, when the set time has elapsed, the routine proceeds to step 502. When it is determined at step 502 that the engine is operating under low load, the routine proceeds to step 505. At step 505, the exhaust control valve 24 is substantially fully closed.

Next, at step 506, the target opening degree $\theta$ of the throttle valve 18 predetermined in accordance with the operating state of the engine is calculated. Next, at step 507, it is determined if the back pressure P detected by the pressure sensor 80 is lower than a value ($P_0-\alpha$) smaller than the target value $P_0$ by exactly a constant value $\alpha$. When $P<P_0-\alpha$, the routine proceeds to step 508, where a constant value k is added to the correction value $\Delta\theta$ with respect to the target opening degree $\theta$ of the throttle valve 18. On the other hand, when $P \geq P_0-\alpha$, the routine proceeds to step 509, where it is determined if the back pressure P is higher than a value ($P_0+\alpha$) greater than the target value $P_0$ by exactly a constant value $\alpha$. When $P>P_0+\alpha$, the routine proceeds to step 510, where a constant value k is subtracted from the correction value $\Delta\theta$.

Next, a step 511, the value of $\theta$ plus $\Delta\theta$ is made the final target opening degree $\theta_0$ of the throttle valve 18. That is, when $P<P_0-\alpha$, the opening degree of the throttle valve 18 is increased, so the amount of intake air is increased, while when $P>P_0+\alpha$, the opening degree of the throttle valve 18 is decreased, so the amount of intake air is decreased. Due to this, the back pressure P is controlled so that $P_0-\alpha<P<P_0+\alpha$. Next, at step 512, the injection of the main fuel Qm is controlled. That is, when the engine is starting up and in warmup operation, the amount of injection of main fuel Qm is made the X shown in FIG. 9, while when the engine is operating under low load, the amount of injection of the main fuel Qm is made the X shown in FIG. 10. Next, at step 513, the injection of the auxiliary fuel Qa is controlled.

Now, as explained above, if the exhaust control valve 24 is substantially fully closed, the amount of injection X of the main fuel Qm is increased, and the auxiliary fuel Qa is additionally injected, the amount of unburned hydrocarbons exhausted into the atmosphere can be greatly reduced without the torque generated by the engine falling. When the required load of the engine becomes high during warmup operation, however, if the exhaust control valve 24 is held in a substantially fully closed state, the torque generated by the engine ends up falling with respect to the required value. Therefore, it is necessary to open the exhaust control valve 24 when the required load of the engine becomes high during warmup operation.

In this case, however, if the exhaust control valve 24 is fully opened, a fall in the torque generated by the engine is prevented, but the oxidation reaction of the unburned hydrocarbons in the exhaust passage does not proceed and therefore the amount of unburned hydrocarbons exhausted into the atmosphere is increased. Therefore, fully opening the exhaust control valve 24 when the required load of the engine becomes high is not preferable. Therefore, in the embodiment shown in FIG. 21 and FIG. 22, when a representative value representing the required load of the engine becomes high, the opening degree of the exhaust control valve 24 is made larger along with the rise in the representative value. Due to this, the exhaust of the unburned hydrocarbons into the atmosphere can be suppressed while suppressing the fall in the torque generated by the engine.

Figure 21:
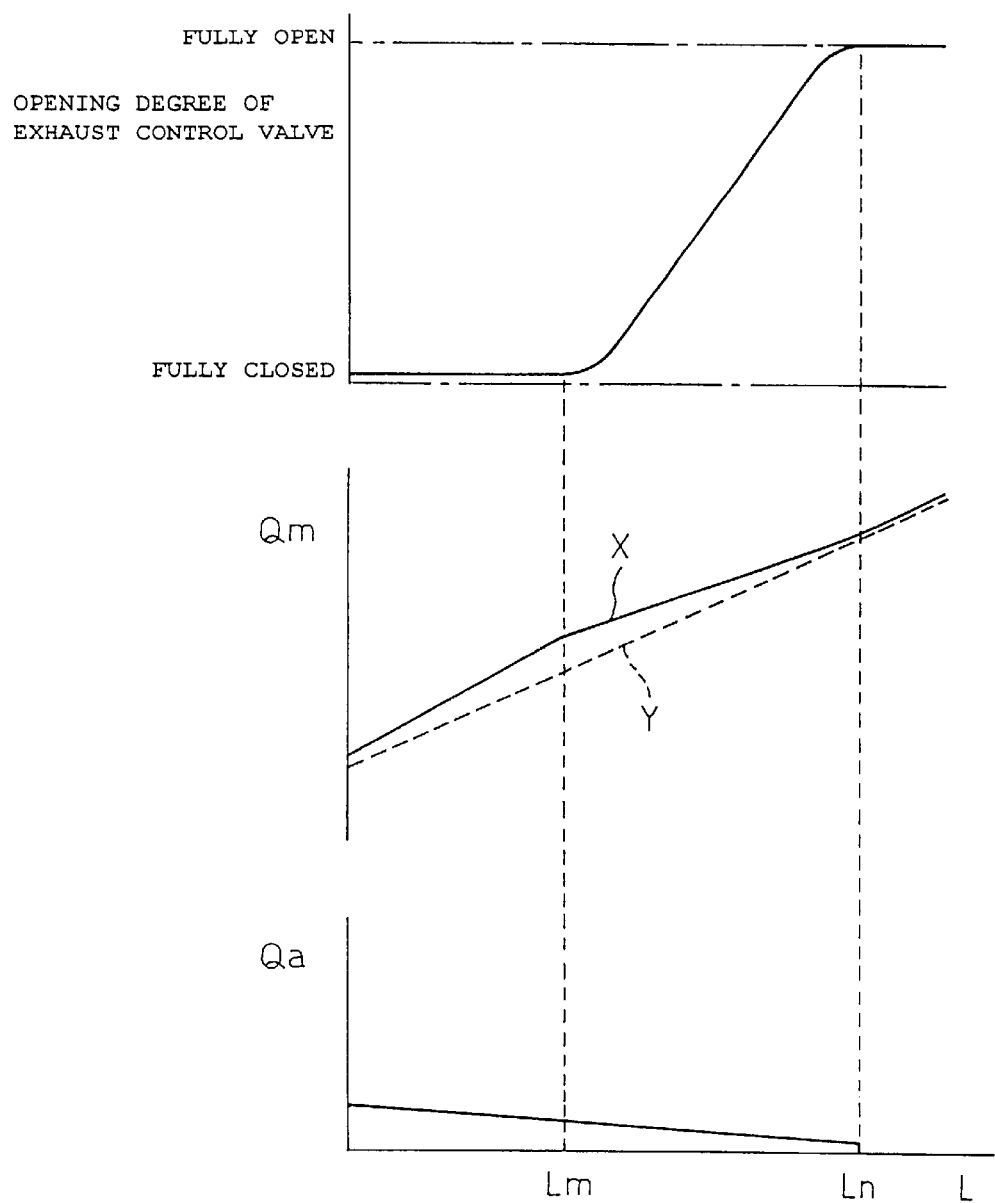
FIG. 21 is a view of the relation between the amount of depression of the accelerator pedal and the opening degree of the exhaust control valve.

In this embodiment, the amount of depression L of the accelerator pedal 50 is used as a representative value representing the required torque. The relationship between the amount of depression L of the accelerator pedal 50 and the opening degree of the exhaust control valve 24 in this case is shown in FIG. 21. As shown in FIG. 21, in this embodiment, when the amount of depression L of the accelerator pedal 50 is smaller than a predetermined first amount of depression Lm, the exhaust control valve 24 is substantially fully closed; when the amount of depression L of the accelerator pedal 50 becomes larger than a predetermined second amount of depression Ln (>Lm), the exhaust control valve 24 is fully opened; while when the amount of depression L of the accelerator pedal 50 is between the first amount of depression Lm and the second amount of depression Ln, the opening degree of the exhaust control valve 24 is made larger along with an increase of the amount of depression L of the accelerator pedal 50.

That is, between the first amount of depression Lm and the second amount of depression Ln, the opening degree of the exhaust control valve 24 is set to the smallest opening degree giving the highest back pressure without the torque generated by the engine falling much at all with respect to the required generated torque. Therefore, when the amount of depression L of the accelerator pedal 50 is between the first amount of depression Lm and the second amount of depression Ln, if the opening degree of the exhaust control valve 24 is made the opening degree shown in FIG. 21 corresponding to the amount of depression L of the accelerator pedal 50, the torque generated by the engine does not fall much at all and the oxidation reaction of the unburned hydrocarbons in the exhaust passage is promoted, so the amount of the unburned hydrocarbons exhausted into the atmosphere can be reduced.

Note that as will be understood from FIG. 21, at the time of slow acceleration operation where the amount of depression L of the accelerator pedal 50 changes from L<Lm to Lm<L<Ln, the exhaust control valve 24 is opened up to the opening degree in accordance with the amount of depression L of the accelerator pedal 50, but at the time of fast acceleration operation where the amount of depression L of the accelerator pedal 50 changes from L<Lm to L>Ln, the exhaust control valve 24 is fully opened. Therefore, the opening degree of the exhaust control valve 24 changes in accordance with the degree of acceleration. The higher the degree of acceleration, the greater the opening degree of the exhaust control valve 24.

On the other hand, the amount of drop of the generated torque with respect to the required generated torque when the exhaust control valve 24 is fully opened under the same engine operating state becomes smaller the larger the opening degree of the exhaust control valve 24. Therefore, in this embodiment, between the first amount of depression Lm and the second amount of depression Ln, as shown in FIG. 21, the increase in the amount of injection X of the main fuel Qm with respect to the optimum amount of injection Y of the main fuel Qm when the exhaust control valve 24 is fully opened under the same engine operating conditions is reduced along with an increase in the amount of depression L of the accelerator pedal 50.

Further, as shown in FIG. 21, the amount of injection of auxiliary fuel Qa decreases the greater the amount of depression L of the accelerator pedal 50. In the embodiment shown in FIG. 21, when L>Ln, the injection of the auxiliary fuel Qa is stopped.

Further, even in this embodiment, as shown in FIG. 10, at the time of engine low load operation, the exhaust control valve 24 is substantially fully closed, the amount of injection X of the main fuel Qm is increased over the optimum amount of increase Y of the main fuel Qm when the exhaust control valve 24 is fully opened under the same engine operating conditions, and the auxiliary fuel Qa is additionally injected. Next, if the engine is not in the low load operating state, the exhaust control valve 24 is immediately fully opened.

Figure 22:
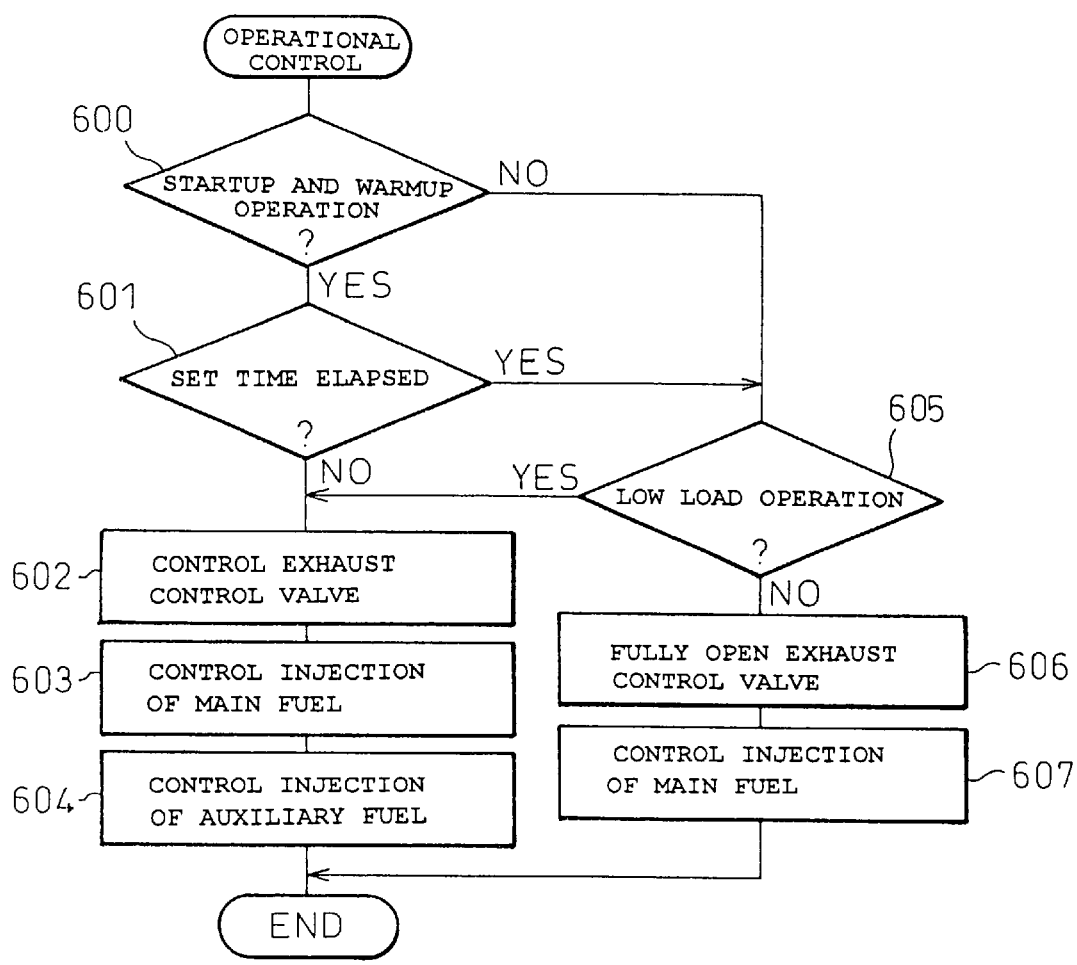
FIG. 22 is a view of the amount of injection of the main fuel and the opening degree of the exhaust control valve.

FIG. 22 shows the routine for operational control.

Referring to FIG. 22, first, at step 600, it is judged if the engine is starting up and in warmup operation. If the engine is starting up and in warmup operation, the routine proceeds to step 601, where it is determined if a predetermined set time has elapsed after the startup of the engine. When the set time has not elapsed, the routine proceeds to step 602. On the other hand, when it is determined at step 600 that the engine is starting up and in warmup operation or when it is determined at step 601 that the set time has elapsed, the routine proceeds to step 605, where it is determined if the engine load is lower than a set load, that is, the engine is operating under low load. At the time of low load operation, the routine proceeds to step 602.

At step 602, the opening degree of the exhaust control valve 24 is controlled. That is, at the time of engine startup and warmup operation, the opening degree of the exhaust control valve 24 is made an opening degree in accordance with the amount of depression L of the accelerator pedal 50 shown in FIG. 21. As opposed to this, when it is judged at step 605 that the engine is operating under low load, the exhaust control valve 24 is substantially fully closed. Next, at step 603, the injection of the main fuel Qm is controlled. That is, if the engine is starting up and in warmup operation, the amount of injection of the main fuel Qm is made the X shown in FIG. 21. When it is judged at step 605 that the engine is operating under low load, the amount of injection of the main fuel Qm is made the X shown in FIG. 10. Next, at step 604, the injection of the auxiliary fuel Qa is controlled.

On the other hand, when it is judged at step 605 that the engine is not operating under low load, the routine proceeds to step 606, where. the exhaust control valve 24 is fully opened, then the routine proceeds to step 607, where the injection of the main fuel Qm is controlled. At this time, the auxiliary fuel Qa is not injected.

In the embodiments explained up to here, however, just when the engine was starting up, the exhaust control valve 24 was substantially fully closed, the main fuel Qm was increased, and the auxiliary fuel Qa was additionally injected. At the time of engine startup, however, the temperature of the engine is low, so if the auxiliary fuel is injected at this time, the auxiliary fuel will not sufficiently burn and therefore there will be the danger of the amount of unburned hydrocarbons generated conversely increasing. Therefore, in the embodiment explained below, the injection of the auxiliary fuel at the time of engine startup is controlled so that a large amount of unburned hydrocarbons is not generated at the time of engine startup.

Figure 23:
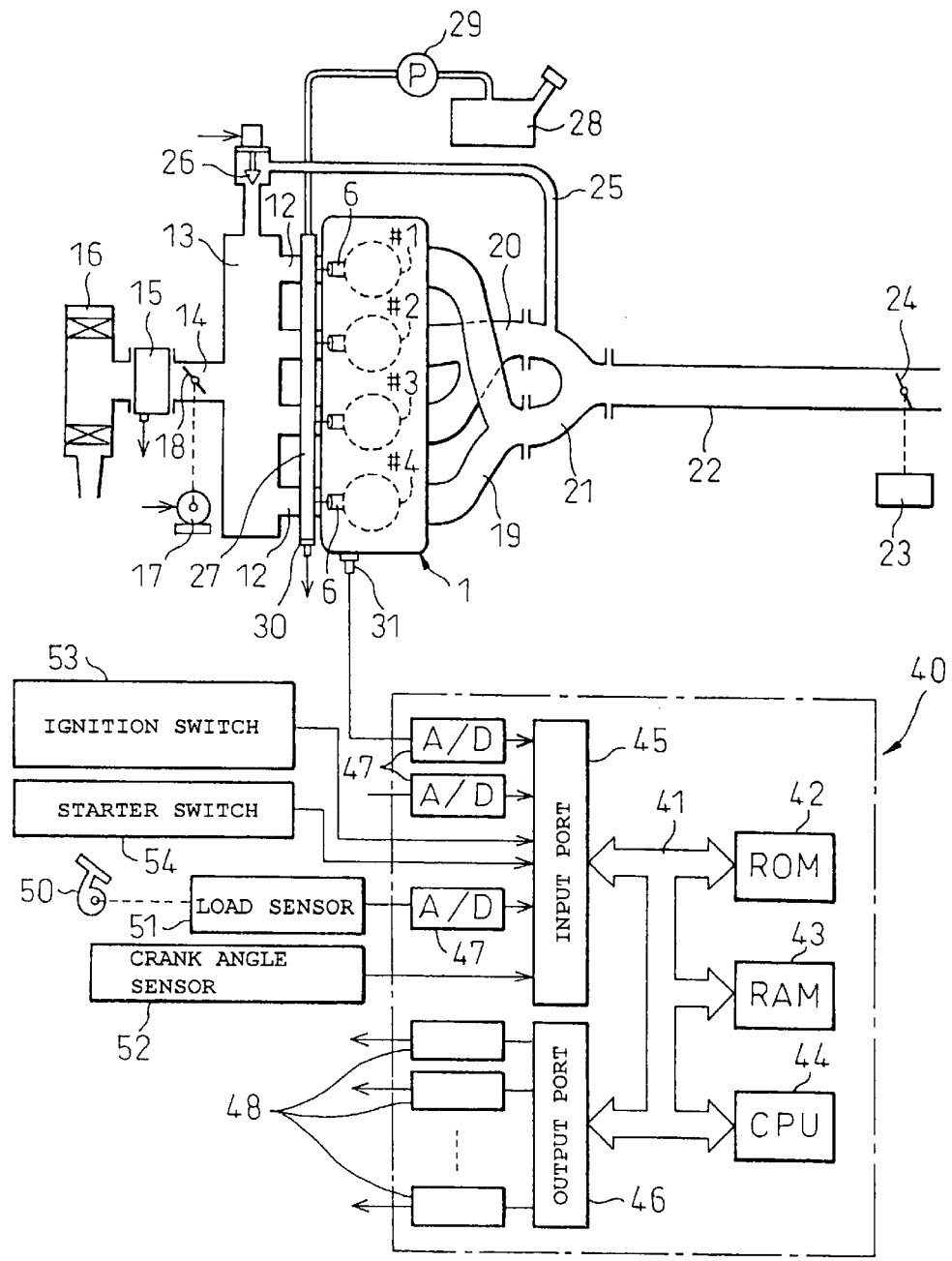
FIG. 23 is an overview of still another embodiment of an internal combustion engine.

FIG. 23 is an overview of an internal combustion engine used at this time. As will be understood from FIG. 23, in this internal combustion engine, the operating signal of the ignition switch 53 and the operating signal of the starter switch 54 are input to the input port 45.

Next, an explanation will be given, referring to FIG. 24, of an embodiment where the amount of injection of the auxiliary fuel is gradually increased after the engine starts operating under its own power at the time of engine startup so as to prevent the generation of a large amount of unburned hydrocarbons at the time of engine startup. Note that FIG. 24 shows the operation of the ignition switch 53, the change in the opening degree of the exhaust control valve 24, the operation of the starter switch 54, the engine speed N, the change in the amount of injection Qm of the main fuel, and the amount of injection Qa of the auxiliary fuel.

Figure 24:
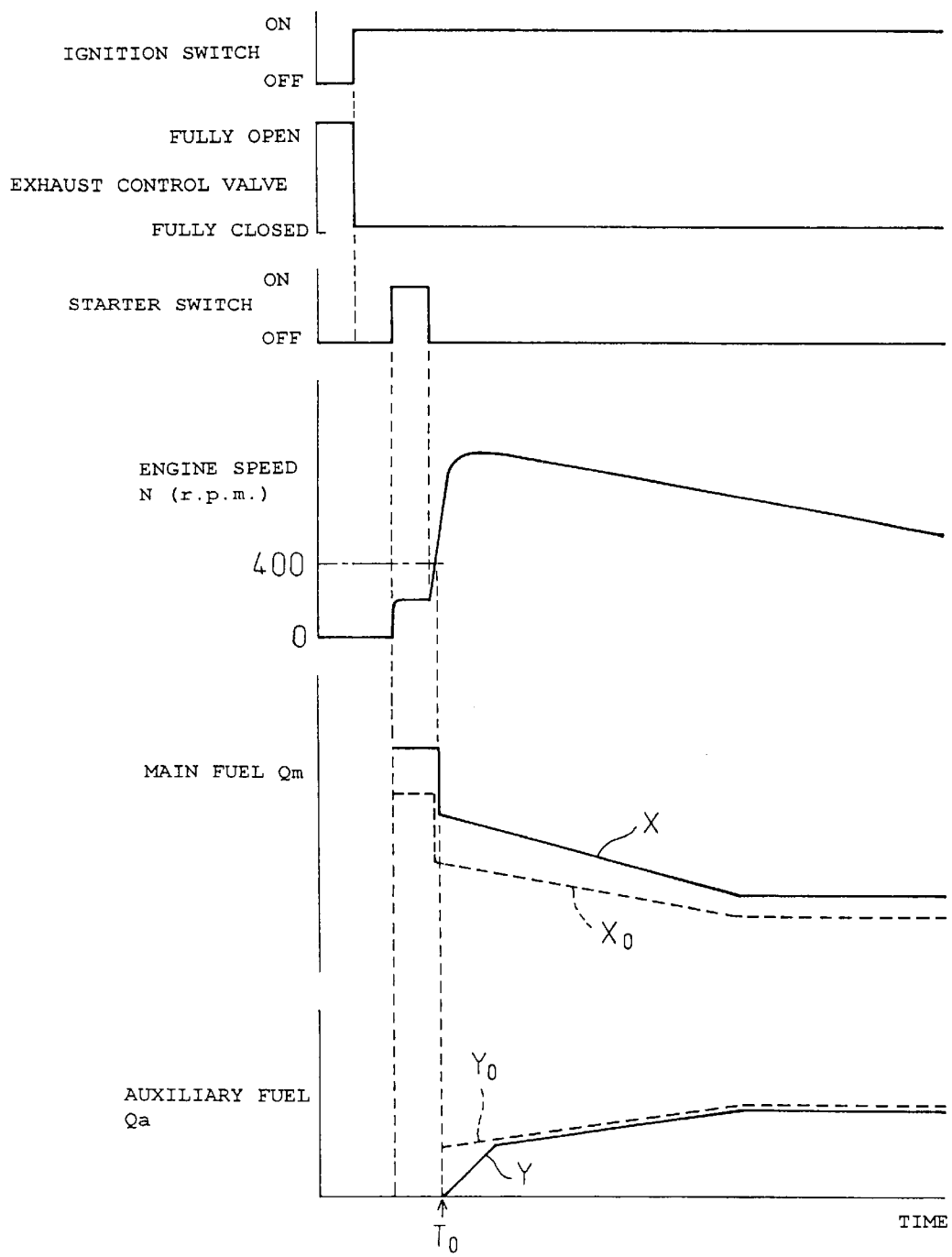
FIG. 24 is a time chart of the change of the auxiliary fuel Qa.

As shown in FIG. 24, while the ignition switch 53 is off, the exhaust control valve 24 is held in the fully open state. When the ignition switch 53 is switched from off to on, the exhaust control valve 24 is switched from the fully opened state to the substantially fully closed state. Next, when the starter switch 54 is turned on, the injection of the main fuel Qm is started. The change in the amount of injection Qm of the main fuel at this time is shown by the solid line X in FIG. 24.

That is, the solid line X in FIG. 24 shows the optimum amount of injection of the main fuel Qm when substantially fully closing the exhaust control valve 24, while the broken line $X_0$ shows the optimum amount of injection of the main fuel Qm when fully opening the exhaust control valve 24. Therefore, in this embodiment as well, it is learned that at the time of engine startup and warmup operation, the amount of injection X of the main fuel Qm is increased from even the optimum amount of injection $X_0$ of the main fuel Qm when the exhaust control valve 24 is fully opened under the same engine operating conditions.

While the engine is being driven by the starter motor, the engine speed N is maintained at a substantially constant speed of about 200 rpm. When the engine starts operating under its own power, the engine. speed N rapidly rises. In this case, in this embodiment, when the engine speed N exceeds a predetermined speed, for example, 400 rpm, it is judged that the engine has started operating under its own power. When it is judged that the engine has started to operate under its own power, the amount of injection X of the main fuel Qm is rapidly decreased.

On the other hand, in FIG. 24, the broken line $Y_0$ shows the target amount of injection of the auxiliary fuel Qa predetermined in accordance with the operating state of the engine. The target amount of injection $Y_0$ shows the amount of injection of fuel required for maintaining the temperature of the exhaust gas at the exhaust port 11 outlet at the target temperature, for example, 800° C. The target amount of injection $Y_0$ increases along with a decrease of the amount of injection X of the main fuel. The target amount of injection $Y_0$ of the auxiliary fuel Qa is stored in the ROM 42 in advance as a function of the required load L and the engine speed N.

In FIG. 24, the solid line Y shows an actual amount of injection of the auxiliary fuel Qa. As shown in FIG. 24, in this embodiment, if it is judged that the engine has started operating under its own power, the injection of the auxiliary fuel Qa is started, then the amount of injection Y of the auxiliary fuel Qa is gradually increased toward the target amount of injection $Y_0$.

Right after the engine starts operating under its own power, the temperature of the engine body 1 is low. Therefore, at this time, if a large amount of auxiliary fuel Qa is injected, not all of the injected fuel is burned well, so a large amount of unburned hydrocarbons is generated. Therefore, at this time, a small amount of auxiliary fuel Qa is injected. On the other hand, after the engine starts operating under its own power, the temperature of the engine body 1 gradually rises and therefore even if the amount of injection of the auxiliary fuel Qa is increased, the auxiliary fuel Qa burns well. Therefore, after the engine starts operating under its own power, as shown in FIG. 24, the amount of injection Y of the auxiliary fuel Qa is gradually increased toward the target amount of injection $Y_0$.

Figure 25:
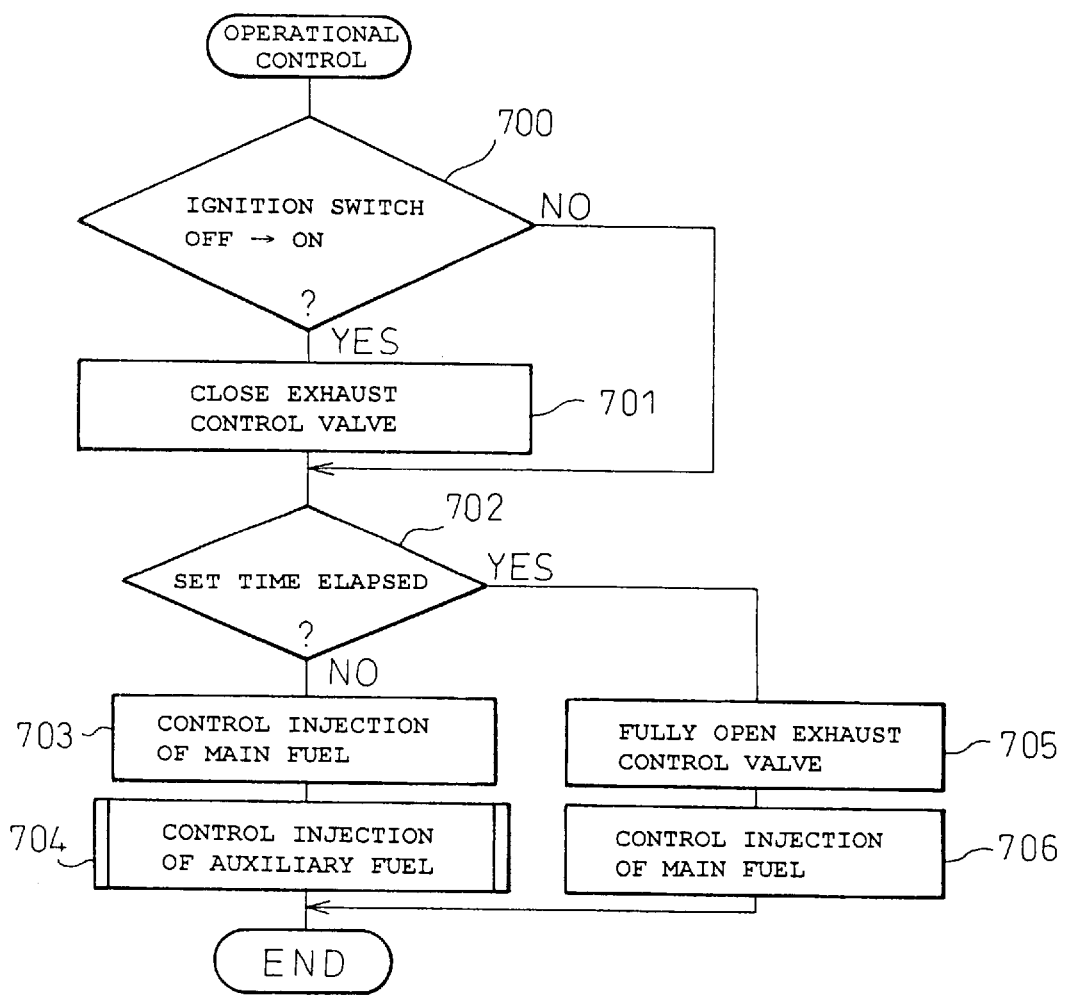
FIG. 25 is a flow chart of the operational control.

FIG. 25 shows a routine for operational control.

Referring to FIG. 25, first, at step 700, it is determined if the ignition switch 53 has been switched from off to on. When the ignition switch 53 is switched from off to on, the routine proceeds to step 701, where the exhaust control valve 24 is switched from the fully opened state to the substantially fully closed state. Next, at step 702, it is determined if a predetermined set time has elapsed from when the engine starts operating, for example, from when the engine starts operating on its own power.

When the set time has not elapsed, the routine proceeds to step 703, where the injection of the main fuel Qm is controlled. That is, the amount of injection of the main fuel Qm is made the X shown in FIG. 24. Next, at step 704, the injection of the auxiliary fuel Qa is injected. That is, the amount of injection of the auxiliary fuel Qa is made the Y shown in FIG. 24. On the other hand, when it is judged at step 702 that the set time has elapsed, the routine proceeds to step 705, where the exhaust control valve 24 is fully opened, then the routine proceeds to step 706, where the injection of the main fuel Qm is controlled. At this time, the auxiliary fuel Qa is not injected.

Figure 26:
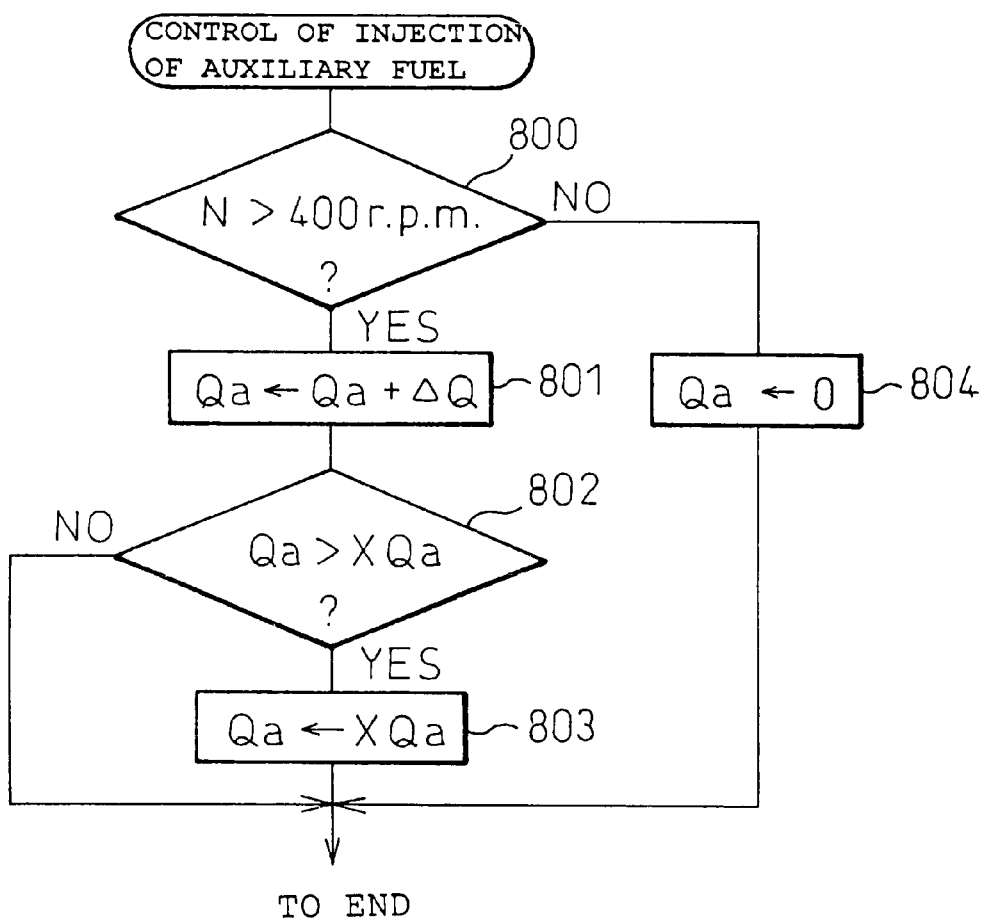
FIG. 26 is a flow chart of execution of injection control of auxiliary fuel.

FIG. 26 shows the control of the injection of the auxiliary fuel performed at step 704 of FIG. 25 for working the embodiment shown in FIG. 24.

Referring to FIG. 26, first, at step 800, it is judged if the engine speed N has become higher than 400 rpm, that is, if the engine has started to operate on its own power. When $N \leq 400$ rpm, the routine proceeds to step 804, where the amount of injection Qa of the auxiliary fuel is made zero. That is, the injection of the auxiliary fuel is stopped. As opposed to this, when N>400 rpm, the routine proceeds to step 801, where a constant value ΔQ is added to the amount of injection Qa of the auxiliary fuel. Next, at step 802, it is judged if the amount of injection Qa of the auxiliary fuel has become larger than the target amount of injection XQa in accordance with the operating state of the engine shown by $Y_0$ at FIG. 24. When Qa>XQa, the routine proceeds to step 803, where Qa is made XQa. Therefore, if the engine starts operating under its own power, the amount of injection Qa of the auxiliary fuel is gradually increased toward the target amount of injection XQa. When the amount of injection Qa of the auxiliary fuel reaches the target amount of injection XQa, the amount of injection Qa of the auxiliary fuel is then maintained at the target amount of injection XQa.

Figure 27:
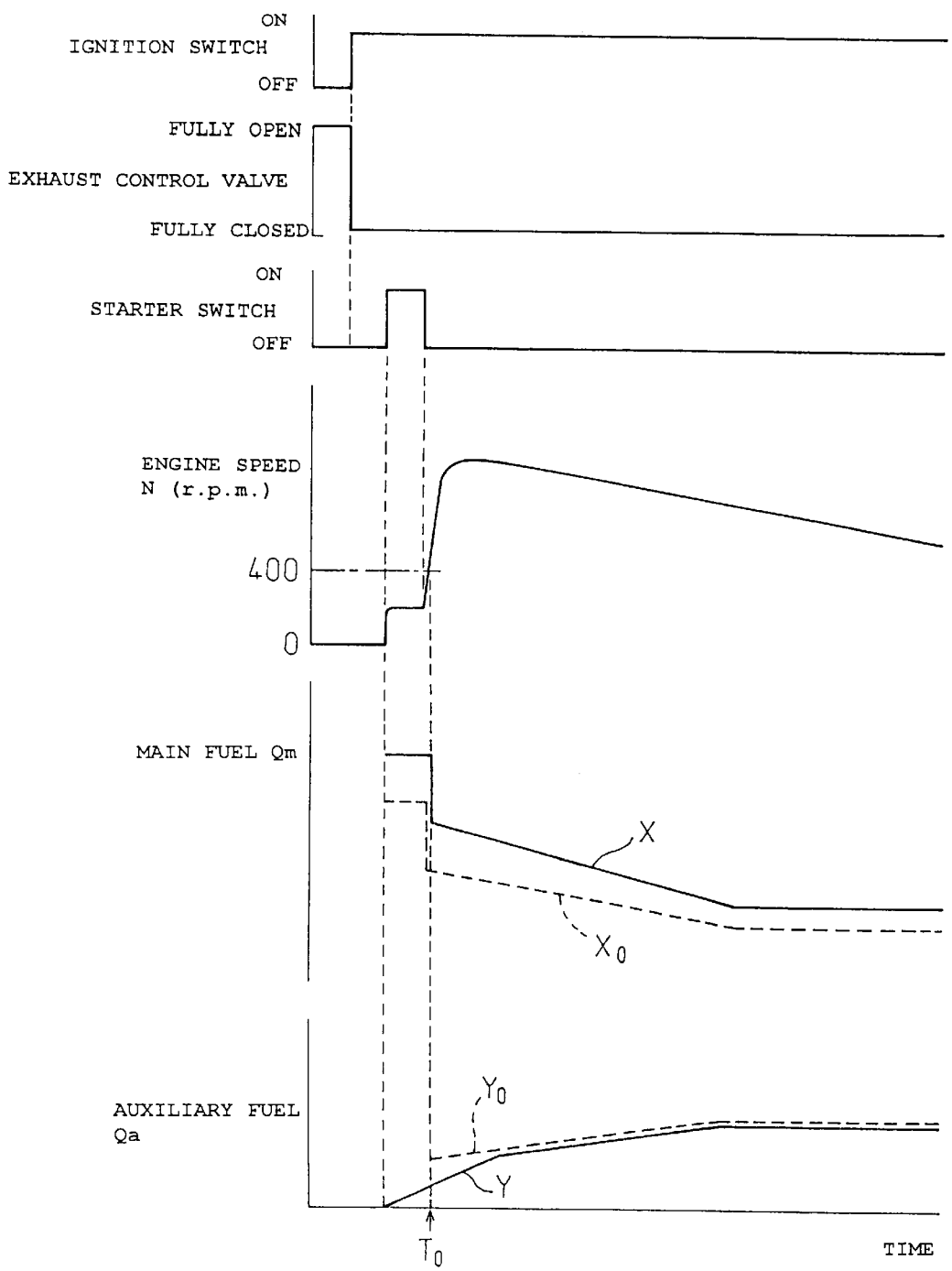
FIG. 27 is a time chart of the change of the auxiliary fuel Qa.

FIG. 27 shows another embodiment. In this embodiment, as shown by the solid line Y in FIG. 27, the amount of injection Qa of auxiliary fuel is gradually increased from before the engine starts operating under its own power, that is, from when the starter switch 54 is switched from off to on. The amount of injection Qa. of the auxiliary fuel reaches the target amount of injection $Y_0$ after the engine starts operating under its own power.

Figure 28:
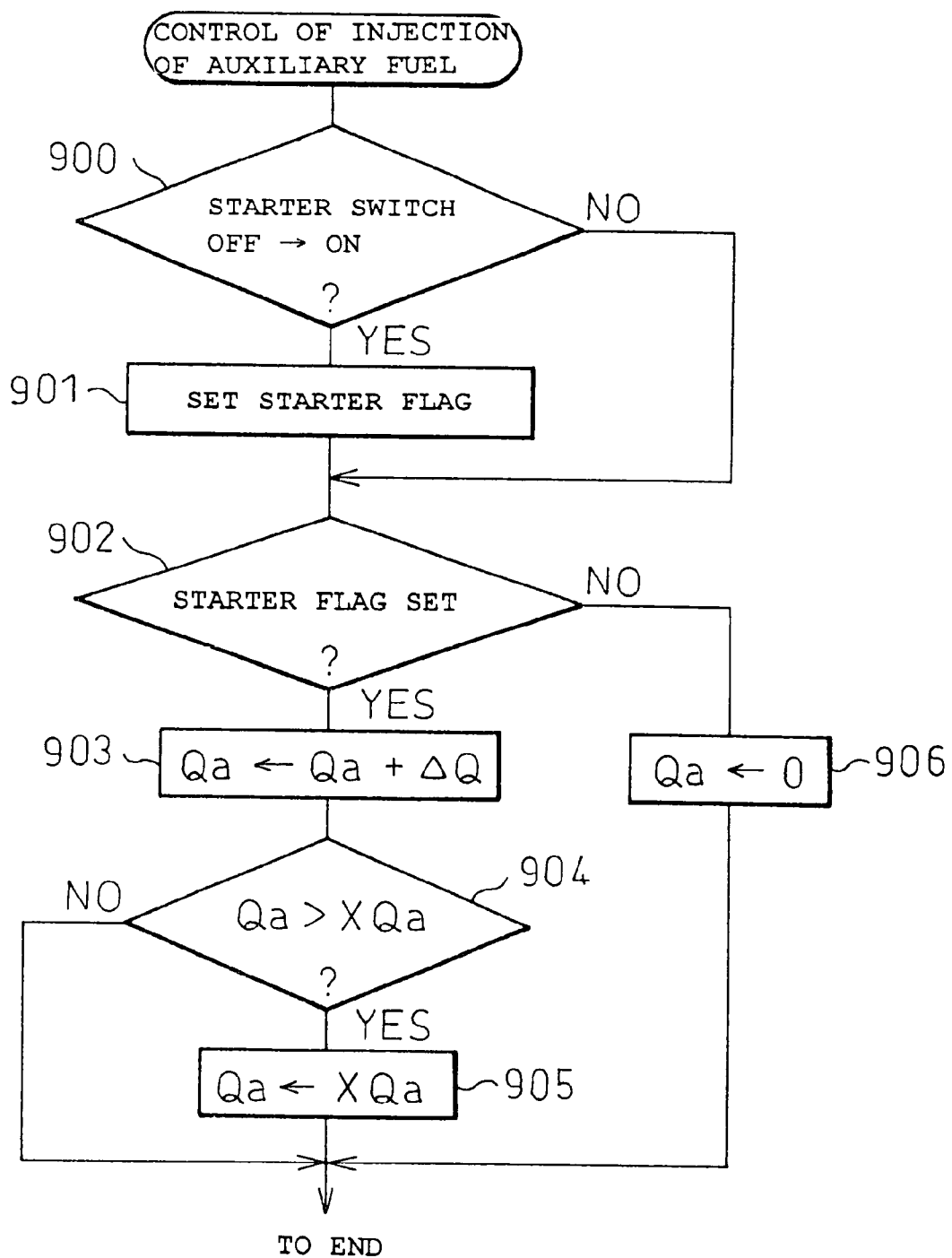
FIG. 28 is a flow chart of execution of injection control of auxiliary fuel.

FIG. 28 shows the control of the injection of auxiliary fuel performed at step 704 in FIG. 25 for working the embodiment shown in FIG. 27.

Referring to FIG. 28, first, at step 900, it is determined if the starter switch 54 has been switched from off to on. When the starter switch 54 has been switched from off to on, the routine proceeds to step 901, where the starter flag is set, then the routine proceeds to step 902.

At step 902, it is determined if the starter flag has been set. When the starter flag has not been set, that is, when the engine is stopped, the routine proceeds to step 906, where the amount of injection Qa of the auxiliary fuel is made zero. That is, the injection of auxiliary fuel is stopped. As opposed to this, when the starter flag is set, the routine proceeds to step 903, where the constant value ΔQ is added to the amount of injection Qa of the auxiliary fuel. Next, at step 904, it is determined if the amount of injection Qa of the auxiliary fuel has become larger than the target amount of injection XQa in accordance with the operating state of the engine shown by $Y_0$ in FIG. 27. When Qa>XQa, the routine proceeds to step 905, where Qa is made XQa. Therefore, when the starter switch 54 is switched from off to on, the amount of injection Qa of the auxiliary fuel is gradually increased toward the target amount of injection XQa. When the amount of injection Qa of the auxiliary fuel reaches the target amount of injection XQa, the amount of injection Qa of the auxiliary fuel then is maintained at the target amount of injection XQa.

Figure 29:
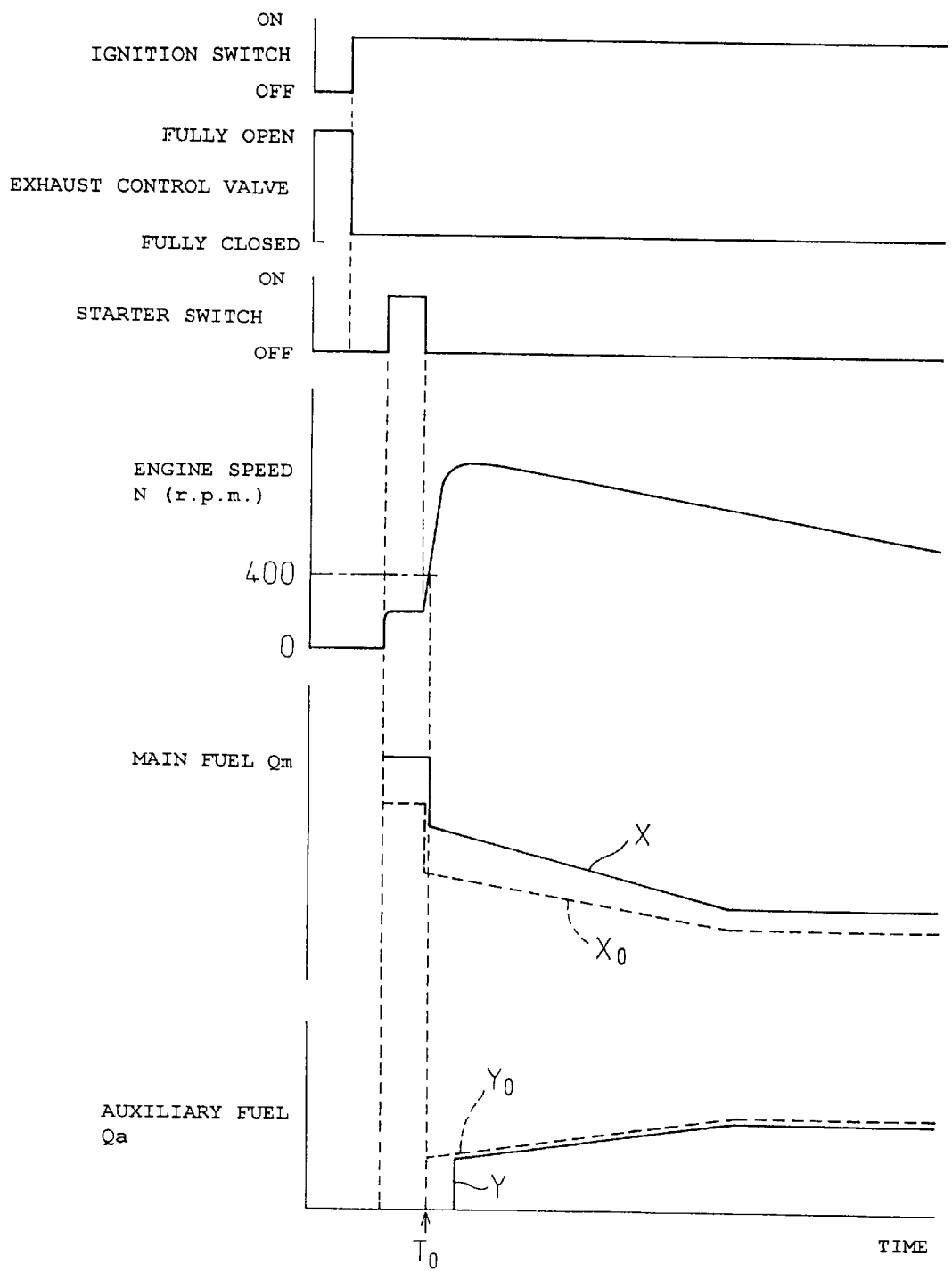
FIG. 29 is a time chart of the change of the auxiliary fuel Qa.

FIG. 29 shows a further embodiment. In this embodiment, as shown by the solid line Y in FIG. 29, the injection of the auxiliary fuel Qa is started by the target amount of injection $Y_0$ after a predetermined time elapses from when the engine starts to operate under its own power. That is, in this embodiment, even if the auxiliary fuel Qa is injected by the target amount of injection $Y_0$, the auxiliary fuel Qa starts to be injected at the timing when all of the fuel can be burned well.

Figure 30:
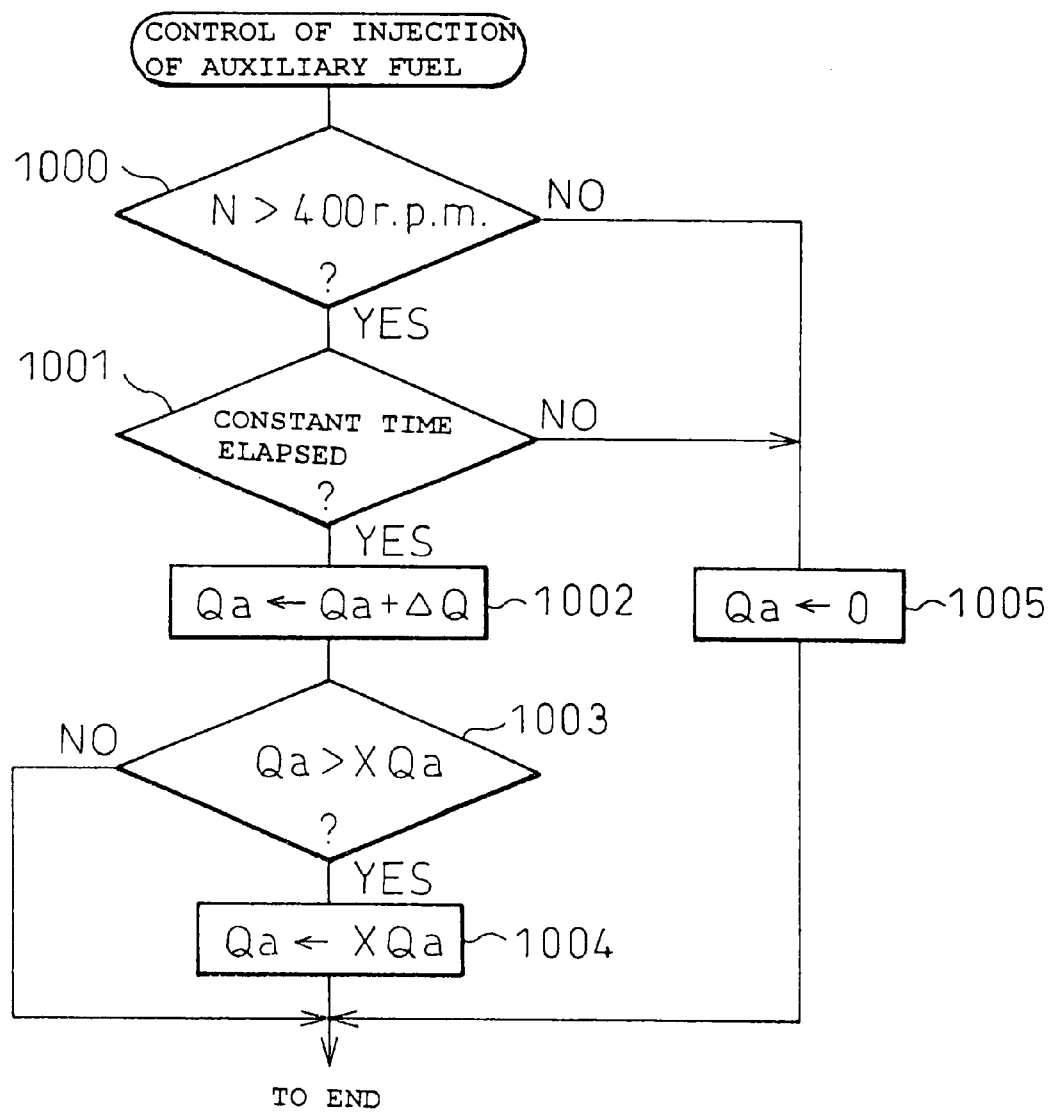
FIG. 30 is a flow chart of execution of injection control of auxiliary fuel.

FIG. 30 shows the control of the injection of auxiliary fuel performed at step 704 in FIG. 25 for working the embodiment shown in FIG. 29. Referring to FIG. 30, first, at step 1000, it is determined if the engine speed N has become higher than 400 rpm, that is, if the engine has started operating under its own power. When N>400 rpm, the routine proceeds to step 1001, where it is determined if a constant time has elapsed from when N>400 rpm. When it is determined at step 1000 that N≦400 rpm or it is determined at step 1001 that a constant time has not elapsed after N>400 rpm, the routine proceeds to step 1005, where the amount of injection Qa of auxiliary fuel is made zero. That is, the injection of the auxiliary fuel is stopped.

As opposed to this, when it is judged at step 1101 that a constant time has not elapsed from when N>400 rpm, the routine proceeds to step 1002, where the constant value ΔQ is added to the amount of injection Qa of the auxiliary fuel. Next, at step 1003, it is judged if the amount of injection Qa of the auxiliary fuel has become larger than the target amount of injection XQa in accordance with the operating state of the engine shown by $Y_0$ in FIG. 29. When Qa>XQa, the routine proceeds to step 1003, where Qa is made XQa. Therefore, when a constant time has elapsed from when the engine starts operating under its own power, the amount of injection Qa of the auxiliary fuel is gradually increased up to the target amount of injection XQa, then the amount of injection Qa of the auxiliary fuel is maintained at the target amount of injection XQa. In this case, if ΔQ=XQa is set, as shown in FIG. 29, when a constant time has elapsed from when the engine starts operating under its own power, the amount of injection Qa of auxiliary fuel is increased all at once up to the target amount of injection XQa, then the amount of injection Qa of the auxiliary fuel is maintained at the target amount of injection XQa.

Next, an explanation will be made of an embodiment where the oxidation reaction of the unburned hydrocarbons in the exhaust passage is promoted.

Figure 31:
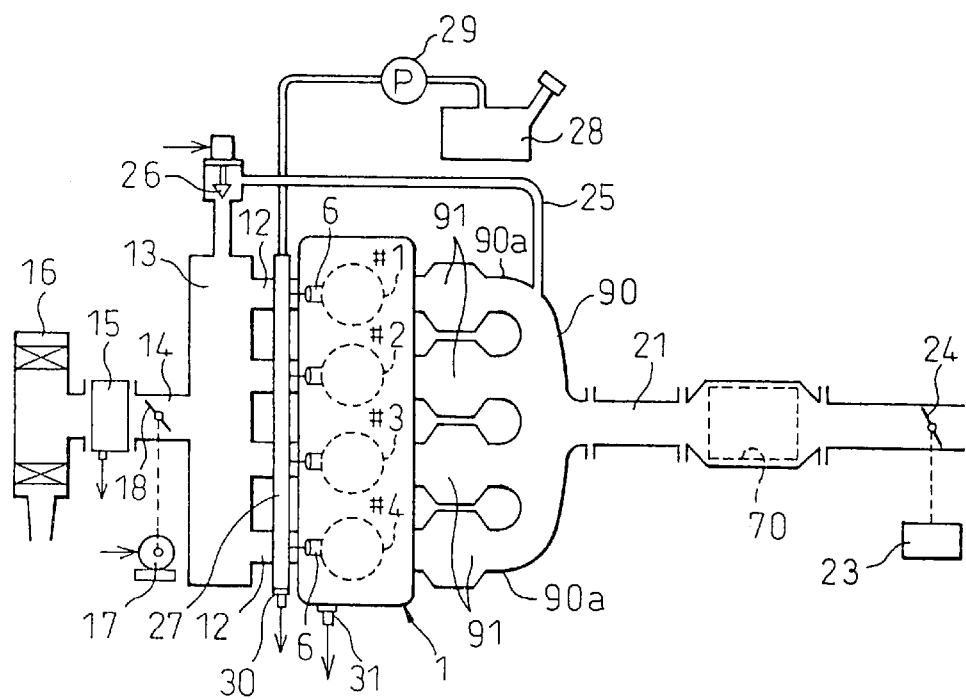
FIG. 31 is an overview of still another embodiment of an internal combustion engine.

In the embodiment shown in FIG. 31, the exhaust ports of the cylinders #1, #2, #3, and #4 are connected to the corresponding tubes 90a of the exhaust manifold 90. Inside each tube 90a is formed an expanded volume chamber 91 having a far larger sectional area than the sectional area of the respective exhaust ports. If expanded volume chambers 91 are formed in the tubes 90a of the exhaust manifold in this way, the flow rate of the exhaust gas becomes slower in the expanded volume chambers 91 and therefore the exhaust gas exhausted from the exhaust ports remains in the exhaust passage upstream of the exhaust control valve 24 under a high temperature over a long period. If the exhaust gas remains in the exhaust passage upstream of the exhaust control valve 24 under a high temperature over a long period, the oxidation reaction of the unburned hydrocarbons in the exhaust passage is promoted and therefore the amount of unburned hydrocarbons exhausted into the atmosphere is further reduced.

In this case, the longer the time the exhaust gas remains in the exhaust passage upstream of the exhaust control valve 24, the greater the amount of reduction of the unburned hydrocarbons. Further, the larger the volume of the expanded volume chamber 91, the longer the time it remains. In the embodiment shown in FIG. 31, to make the time of residence of the exhaust gas longer, the sectional area of the expanded volume chamber 91 is made at least two times the sectional area of the exhaust port and the axial direction length of the expanded volume chamber 91 is made substantially the same as the diameter of the expanded volume chamber 91 or at least the diameter of the expanded volume chamber 91.

Figure 32:
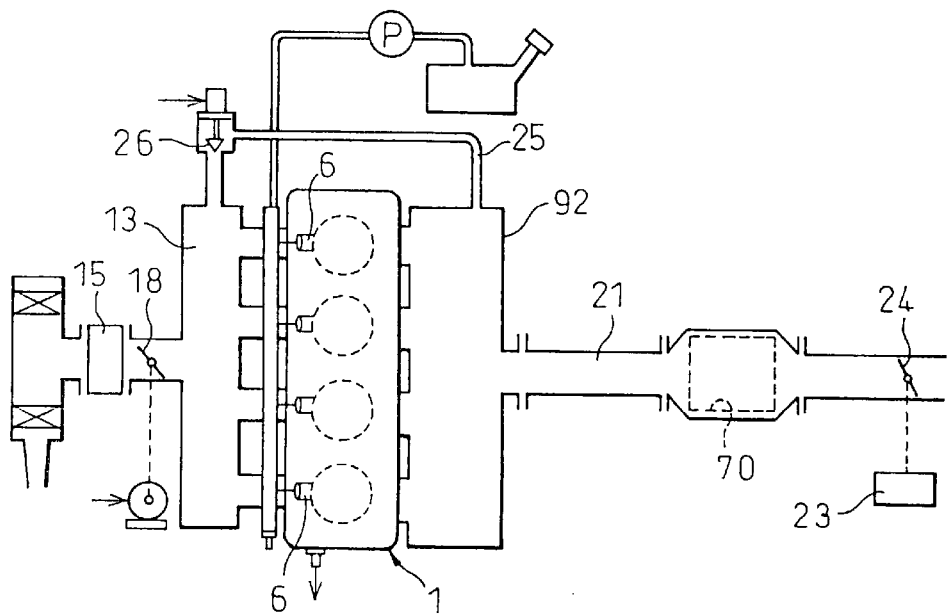
FIG. 32 is an overview of still another embodiment of an internal combustion engine.

As explained above, if expanded volume chambers 91 are provided in the tubes 90a of the exhaust manifold 90, the oxidation reaction of the unburned hydrocarbons in the exhaust gas is promoted. Therefore, these expanded volume chambers 91 form the oxidation reaction promoting means for the unburned hydrocarbons. FIG. 32 shows another example of this oxidation reaction promoting means. In the example shown in FIG. 32, an expanded volume chamber 92 connected to the exhaust ports of the cylinders and common for all cylinders is provided adjoining the outlets of the exhaust ports. In this example, the flow rate of the exhaust gas becomes slower in the expanded volume chamber 92 and therefore the oxidation reaction of the unburned hydrocarbons is promoted.

Figure 33:
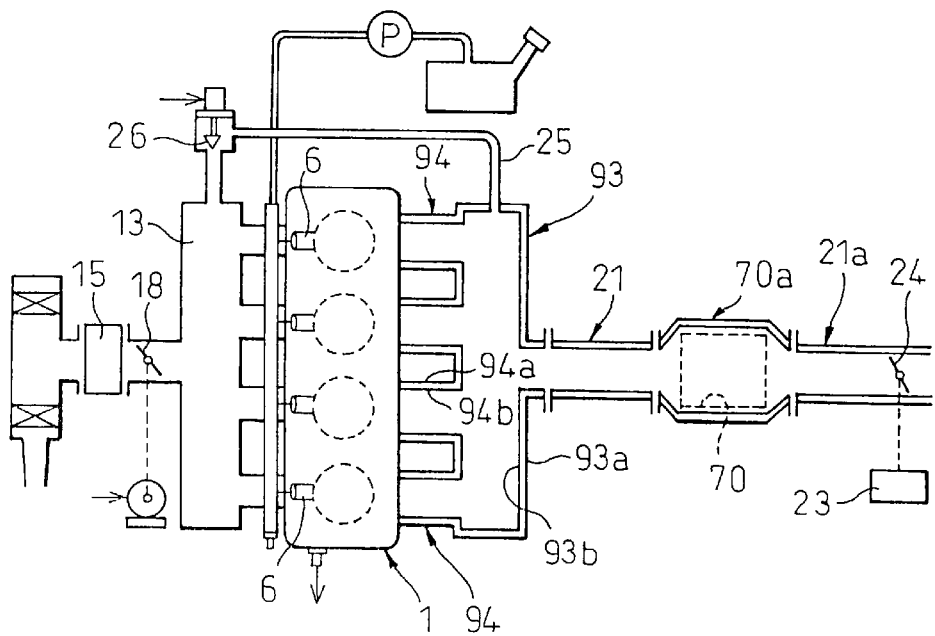
FIG. 33 is an overview of still another embodiment of an internal combustion engine.
Figure 34:
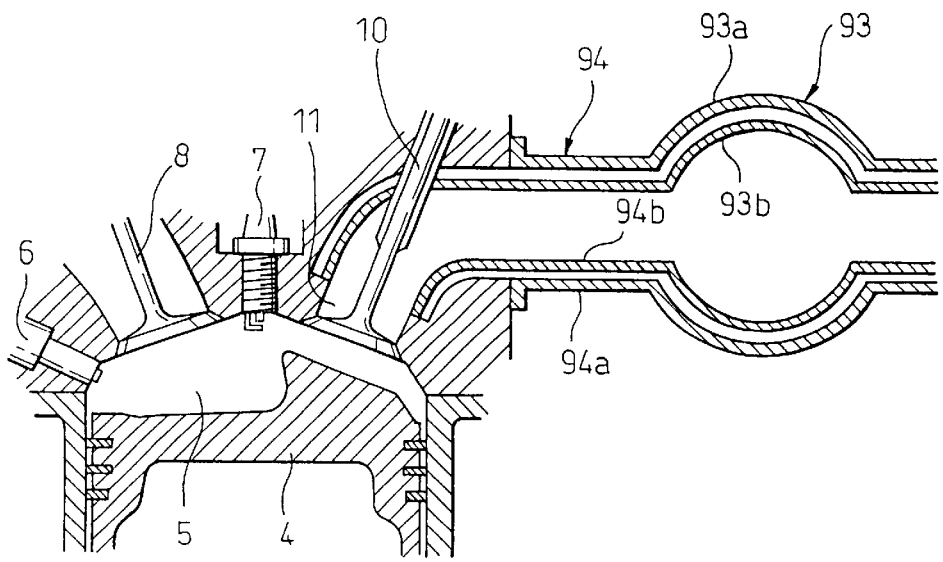
FIG. 34 is a side sectional view of still another embodiment of an internal combustion engine.

On the other hand, it is possible to promote the oxidation reaction of the unburned hydrocarbons in the exhaust gas by warming the exhaust gas as well. FIG. 33 and FIG. 34 show an example of an oxidation reaction promoting means for promoting the oxidation reaction of unburned hydrocarbons by warming the exhaust gas.

Referring to FIG. 33 and FIG. 34, a double wall structure exhaust manifold or reactor 93 is provided in the exhaust passage. The exhaust manifold or reactor 93 is connected to the exhaust port 11 of each cylinder through a tube 94 of the double wall structure. That is, the exhaust manifold or reactor 93 is comprised of a liner 93*b* and an outer frame 93*a* surrounding the liner 93*b* through a space from the liner 93*b*. The tube 94 is comprised of a linear 94*b* and an outer frame 94*a* surrounding the liner 94*b* through a space from the liner 94*b*. As shown in FIG. 34, the liner 94*b* extends up to the inside of the corresponding exhaust port 11. A space is formed around the liner 94*b* in the exhaust port 11 as well. That is, the inside of the exhaust port 11 is also given a double wall structure.

Further, as shown in FIG. 33, the exhaust pipe 21, catalytic converter 70*a*, and exhaust pipe 21*a* all have double wall structures. Therefore, the exhaust gas exhausted from the combustion chamber 5 is held at a high temperature by the adiabatic action due to the double wall structure. Therefore, when the exhaust control valve 24 is substantially fully closed, the oxidation action of the unburned hydrocarbons in the exhaust gas is greatly promoted. Further, in the example shown in FIG. 33 and FIG. 34, the exhaust manifold or reactor 93 form an expanded volume chamber and therefore the oxidation reaction of the unburned hydrocarbons is further promoted.

As another oxidation reaction promoting means for promoting the oxidation reaction of unburned hydrocarbons by warming the exhaust gas, there is also the method of forming the exhaust manifold or exhaust pipe from a material with a low heat conductivity or surrounding the exhaust manifold or exhaust pipe by an insulating material.

Figure 35:
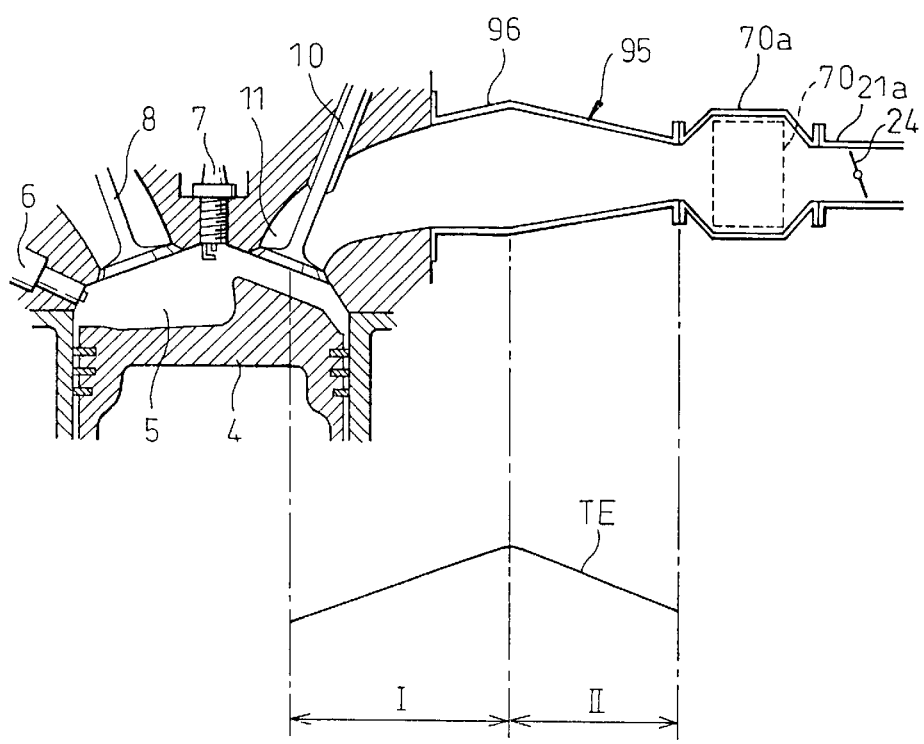
FIG. 35 is a side sectional view of still another embodiment of an internal combustion engine.

FIG. 35 shows still another embodiment of an oxidation reaction promoting means. In this embodiment, as shown in FIG. 35, in the region I where the temperature TE of the exhaust gas rises toward the downstream side, the sectional area of the flow channel of the exhaust gas gradually is increased toward the downstream side, while in the region II where the temperature TE of the exhaust gas falls toward the downstream side, the sectional area of the flow channel of the exhaust gas is gradually reduced toward the downstream side. Specifically speaking, in the region I, the sectional area of the flow channel of the exhaust port 11 and the sectional area of the flow channel of the tube 96 of the exhaust manifold 95 are gradually increased toward the downstream side, while in the region II, the sectional area of the flow channel of the tube 96 of the exhaust manifold 95 is gradually reduced toward the downstream side.

That is, as explained above, when the exhaust control valve 24 is substantially fully closed and auxiliary fuel Qa is injected, the unburned hydrocarbons in the exhaust gas exhausted from the combustion chamber 5 is gradually oxidized while flowing toward the downstream side. As a result, the temperature TE of the exhaust gas exhausted from the combustion chamber 5 gradually rises the further downstream due to the heat of the oxidation reaction of the unburned hydrocarbons as shown in FIG. 35. Next, when going further downstream, the temperature TE of the exhaust gas gradually falls due to the cooling action of the outside air. That is, in the region I where the temperature TE of the exhaust gas rises, the oxidation reaction of the unburned hydrocarbons becomes active, while in the region II, the oxidation reaction of the unburned hydrocarbons does not become that active.

In this case, to promote the oxidation reaction of the unburned hydrocarbons, it is effective to further activate the oxidation reaction of the unburned hydrocarbons in the region I. To activate the oxidation reaction, it is sufficient to make the time the exhaust gas remains under a high temperature longer. For that, it is sufficient to increase the sectional area of the flow channel of the exhaust gas. Therefore, in the region I, the sectional area of the flow channel is gradually increased toward the downstream side. Note that if the sectional area of the flow channel is gradually increased toward the downstream side, the flow of exhaust gas peels off from the inner walls of the exhaust port 11 and exhaust manifold tubes 96, so the cooling action on the exhaust gas becomes weaker and therefore it is possible to promote the oxidation reaction of the unburned hydrocarbons more.

On the other hand, in the region II, the oxidation reaction of the unburned hydrocarbons is originally not that active. Therefore, even if promoting the oxidation reaction of unburned hydrocarbons in the region II, a large effect of reduction of the unburned hydrocarbons cannot be obtained. Further, if the sectional area of the flow channel of the exhaust gas in the region II is increased toward the downstream side, there is the problem that the dimensions of the exhaust system end up becoming extremely large. Further, there is the problem that the output of the engine falls since the exhaust pulsation dies down. Therefore, in the region II, the area of the flow channel of the exhaust gas is gradually reduced toward the downstream side.

Note that in the embodiment shown from FIG. 31 to FIG. 35, it is also possible to arrange a catalyst having an oxidation function in the exhaust ports, in the exhaust manifold, or in the exhaust manifold tubes so as to further promote the oxidation reaction of the unburned hydrocarbons.

LIST OF REFERENCE NUMERALS

5 . . . combustion chamber
6 . . . fuel injector
7 . . . spark plugs
11 . . . exhaust port
13 . . . surge tank
18 . . . throttle valve
19, 20, 90 . . . exhaust manifold
21, 21*a*, 22 . . . exhaust pipe
24 . . . exhaust control valve
70, 71, 72 . . . catalyst

What is claimed is:

1. An exhaust gas purification device of an internal combustion engine wherein an exhaust control valve is arranged a predetermined distance away from an outlet of an engine exhaust port inside an exhaust passage connected to the outlet of the exhaust port; when it is judged that the amount of unburned hydrocarbons exhausted into the atmosphere is to be reduced, the exhaust control valve is substantially fully closed and, in addition to burning the main fuel injected into the combustion chamber under excess air to generate engine output, auxiliary fuel is additionally injected into the combustion chamber at a predetermined timing in the expansion stroke or exhaust stroke where the auxiliary fuel can be burned so that the amount of unburned hydrocarbons produced in the combustion chamber is reduced and the oxidizing reaction of hydrocarbons in the exhaust port and the exhaust passage upstream of the exhaust control valve is promoted; and when the exhaust control valve is substantially fully closed, the amount of injection of main fuel is increased compared with the case where the exhaust control valve is fully opened under the same engine operating conditions.

2. An exhaust gas purification device of an internal combustion engine as set forth in claim 1, wherein it is judged that the amount of exhaust of unburned hydrocarbons into the atmosphere should be reduced when the engine is in warmup operation.

3. An exhaust gas purification device of an internal combustion engine as set forth in claim 1, wherein it is judged that the amount of exhaust of unburned hydrocarbons into the atmosphere should be reduced when the engine is operating under low load.

4. An exhaust gas purification device of an internal combustion engine as set forth in claim 1, wherein the amount of injection of auxiliary fuel is reduced along with an increase of the amount of injection of main fuel when it is judged that the amount of exhaust of unburned hydrocarbons into the atmosphere should be reduced.

5. An exhaust gas purification device of an internal combustion engine as set forth in claim 1, wherein auxiliary fuel in addition to main fuel is burned under excess air.

6. An exhaust gas purification device of an internal combustion engine as set forth in claim 1, wherein an air-fuel mixture formed in a limited region in the combustion chamber by the main fuel is ignited by a spark plug and then the auxiliary fuel is additionally injected.

7. An exhaust gas purification device of an internal combustion engine as set forth in claim 1, wherein a catalyst is arranged in the exhaust passage.

8. An exhaust gas purification device of an internal combustion engine as set forth in claim 7, wherein the catalyst is comprised of an oxidation catalyst, three-way catalyst, $NO_x$ absorbent, or hydrocarbon absorbing catalyst.

9. An exhaust gas purification device of an internal combustion engine as set forth in claim 7, wherein judging means is provided for judging if the catalyst is higher in temperature than an activation temperature and it is judged that the amount of exhaust of unburned hydrocarbons into the atmosphere should be reduced when the catalyst is lower in temperature than the activation temperature and the engine is in warmup operation.

10. An exhaust gas purification device of an internal combustion engine as set forth in claim 7, wherein judging means is provided for judging if the catalyst is higher in temperature than an activation temperature and it is judged that the amount of exhaust of unburned hydrocarbons into the atmosphere should be reduced when the catalyst is lower in temperature than the activation temperature and the engine is operating under low load.

11. An exhaust gas purification device of an internal combustion engine as set forth in claim 7, wherein the catalyst is arranged in the exhaust passage upstream of the exhaust control valve.

12. An exhaust gas purification device of an internal combustion engine as set forth in claim 1, wherein when the amount of exhaust of unburned hydrocarbons into the atmosphere should be reduced, the combustion in the combustion chamber is controlled so that one of the pressure or temperature of the exhaust gas in the exhaust passage upstream of the exhaust control valve becomes a target value.

13. An exhaust gas purification device of an internal combustion engine as set forth in claim 12, wherein the combustion in the combustion chamber is controlled by controlling at least one of an amount of injection of main fuel, amount of injection of auxiliary fuel, and amount of intake air.

14. An exhaust gas purification device of an internal combustion engine as set forth in claim 13, wherein at least one of the amount of injection of main fuel, amount of injection of auxiliary fuel, and amount of intake air is increased when any one of the pressure or temperature of the exhaust gas in the exhaust passage upstream of the exhaust control valve is lower than the target value.

15. An exhaust gas purification device of an internal combustion engine as set forth in claim 1, wherein the exhaust control valve is switched from the fully open state to the substantially fully closed state at the time of engine startup.

16. An exhaust gas purification device of an internal combustion engine as set forth in claim 15, wherein a vacuum tank accumulating vacuum and a vacuum operated type actuator for driving the exhaust control valve are provided, and the actuator is operated by vacuum accumulated in the vacuum tank.

17. An exhaust gas purification device of an internal combustion engine as set forth in claim 1, wherein the exhaust control valve is substantially fully closed when a representative value representing the required load is lower than a predetermined value until a predetermined time elapses after engine startup and wherein the opening degree of the exhaust control valve is made larger along with an increase in the representative value when the representative value becomes larger than a predetermined value until a predetermined time elapses after engine startup.

18. An exhaust gas purification device of an internal combustion engine as set forth in claim 17, wherein the increase in the amount of injection of main fuel is reduced along with an increase in the opening degree of the exhaust control valve until a predetermined time after engine startup elapses.

19. An exhaust gas purification device of an internal combustion engine as set forth in claim 17, wherein the increase in the amount of injection of auxiliary fuel is reduced along with an increase in the opening degree of the exhaust control valve until a predetermined time after engine startup elapses.

20. An exhaust gas purification device of an internal combustion engine as set forth in claim 17, wherein the exhaust control valve is substantially fully closed when the required load is lower than a set load after a predetermined time elapses after engine startup and wherein the exhaust control valve is fully opened when the required load becomes higher than even the set load after a predetermined time elapses after engine startup.

21. An exhaust gas purification device of an internal combustion engine as set forth in claim 20, wherein the oxidation reaction promoting means is comprised of an exhaust port or exhaust passage gradually increased in sectional area of flow channel toward the downstream side, then gradually reduced in sectional area of flow channel toward the downstream side.

22. An exhaust gas purification device of an internal combustion engine as set forth in claim 1, wherein when starting engine operation, after the engine starts operating under its own power, the amount of injection of auxiliary fuel is made the target amount of injection predetermined in accordance with the operating state of the engine.

23. An exhaust gas purification device of an internal combustion engine as set forth in claim 22, wherein the amount of injection of the auxiliary fuel is increased at one time up to the target amount of injection when making the amount of injection of the auxiliary fuel the target amount of injection.

24. An exhaust gas purification device of an internal combustion engine as set forth in claim 22, wherein the amount of injection of the auxiliary fuel is gradually increased toward the target amount of injection when making the amount of injection of the auxiliary fuel the target amount of injection.

25. An exhaust gas purification device of an internal combustion engine as set forth in claim 24, wherein the amount of injection of the auxiliary fuel is gradually increased toward the target amount of injection after the engine starts operating on its own power.

26. An exhaust gas purification device of an internal combustion engine as set forth in claim 24, wherein the amount of injection of the auxiliary fuel is gradually increased toward the target amount of injection before the engine starts operating on its own power.

27. An exhaust gas purification device of an internal combustion engine as set forth in claim 1, wherein oxidation reaction promoting means for promoting the oxidation reaction of unburned hydrocarbons in the exhaust gas is provided in the engine exhaust port or at least the upstream part of the exhaust passage.

28. An exhaust gas purification device of an internal combustion engine as set forth in claim 27, wherein a catalyst is arranged in one of the engine exhaust port or the exhaust passage upstream of the exhaust control valve.

29. An exhaust gas purification device of an internal combustion engine as set forth in claim 27, wherein the oxidation reaction promoting means promotes the oxidation reaction of the unburned hydrocarbons in the exhaust gas by reducing the flow rate of the exhaust gas.

30. An exhaust gas purification device of an internal combustion engine as set forth in claim 29, wherein the oxidation reaction promoting means is comprised of an expanded volume chamber provided in the exhaust passage.

31. An exhaust gas purification device of an internal combustion engine as set forth in claim 27, wherein the oxidation reaction promoting means promotes the oxidation reaction of the unburned hydrocarbons in the exhaust gas by keeping the exhaust gas warm.

32. An exhaust gas purification device of an internal combustion engine as set forth in claim 31, wherein the oxidation reaction promoting means is comprised of a double wall peripheral wall structure.

33. An exhaust gas purification device of an internal combustion engine as set forth in claim 32, wherein an expanded volume chamber is provided inside the exhaust passage upstream of the exhaust control valve and the distance from the inside of the export port to the inside of the expanded volume chamber is made a double wall structure.

* * * * *